(12) United States Patent
Kawaguchi et al.

(10) Patent No.: US 9,412,010 B2
(45) Date of Patent: Aug. 9, 2016

(54) POSTURE ESTIMATION DEVICE, POSTURE ESTIMATION METHOD, AND POSTURE ESTIMATION PROGRAM

(75) Inventors: Kyoko Kawaguchi, Tokyo (JP); Tateaki Nogami, Osaka (JP); Masamoto Tanabiki, Kanagawa (JP); Yuji Sato, Tokyo (JP); Kazuhiko Iwai, Kanagawa (JP); Mitsuko Fujita, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 170 days.

(21) Appl. No.: 14/131,836

(22) PCT Filed: Jul. 2, 2012

(86) PCT No.: PCT/JP2012/004278
§ 371 (c)(1),
(2), (4) Date: Jan. 9, 2014

(87) PCT Pub. No.: WO2013/011644
PCT Pub. Date: Jan. 24, 2013

(65) Prior Publication Data
US 2014/0140596 A1 May 22, 2014

(30) Foreign Application Priority Data

Jul. 15, 2011 (JP) .................................. 2011-156809
Feb. 3, 2012 (JP) .................................. 2012-022283

(51) Int. Cl.
*G06K 9/00* (2006.01)
*G06T 7/00* (2006.01)

(52) U.S. Cl.
CPC ........ *G06K 9/00335* (2013.01); *G06K 9/00348* (2013.01); *G06K 9/00362* (2013.01); *G06T 7/0046* (2013.01); *G06T 2207/30196* (2013.01)

(58) Field of Classification Search
None
See application file for complete search history.

(56) References Cited

U.S. PATENT DOCUMENTS 7,400,939 B2 * 7/2008 Nagasaka ............ B62D 57/032
318/568.1
8,023,726 B2 * 9/2011 Sundaresan ........ G06K 9/00342
345/604

(Continued)

FOREIGN PATENT DOCUMENTS

JP 2002-197463 A 7/2002
JP 2003-101999 A 4/2003
JP 2004-094491 A 3/2004

OTHER PUBLICATIONS

Seigo Nishiyama et al. "Estimation of zero moment point trajectory during human gait locomotion based on a three-dimensional rigid-link model" IEICE Technical Report, vol. 101, No. 734, dated Mar. 12, 2002.

(Continued)

*Primary Examiner* — Chan Park
*Assistant Examiner* — Iman K Kholdebarin
(74) *Attorney, Agent, or Firm* — Pearne & Gordon LLP

(57) ABSTRACT

A posture estimation device, which is able to estimate the posture of a humanoid articulated body with high precision, has: a head estimation unit (120) that estimates the position of a person's head from image information for an image that contains a person; a foot estimation unit (130) that, from the image information, estimates the position of the person's foot for which the sole of the foot is parallel to the floor surface; and a posture estimation unit (140) that estimates the posture of the person on the basis of the relative positional relationship between the estimated head position and the estimated foot position. For example, the posture estimation unit (140) estimates the side on which the foot is located, with respect to the head, as the front side of the person.

16 Claims, 32 Drawing Sheets

(56) References Cited

U.S. PATENT DOCUMENTS

| | | | | |
|---|---|---|---|---|
| 8,135,209 B2* | 3/2012 | Ikeda | ............... | G06K 9/00369 382/103 |
| 8,355,529 B2* | 1/2013 | Wu | ............... | A61B 5/1113 345/420 |
| 8,644,552 B2* | 2/2014 | Han | ............... | G06T 7/20 382/103 |
| 8,695,406 B2* | 4/2014 | Kato | ............... | B21D 5/02 73/65.01 |
| 8,805,584 B2* | 8/2014 | Yamane | ............... | B62D 57/032 700/245 |
| 8,867,820 B2* | 10/2014 | Peeper | ............... | G06T 7/0081 348/42 |
| 9,081,436 B1* | 7/2015 | Berme | ............... | G06F 3/0414 |
| 2004/0176875 A1* | 9/2004 | Iribe | ............... | G06N 3/008 700/245 |
| 2005/0222709 A1* | 10/2005 | Sabe | ............... | B62D 57/032 700/245 |
| 2005/0240307 A1* | 10/2005 | Kuroki | ............... | B25J 13/085 700/245 |
| 2007/0267994 A1* | 11/2007 | Sugihara | ............... | B62D 57/032 318/568.12 |
| 2008/0112592 A1* | 5/2008 | Wu | ............... | A61B 5/1113 382/103 |
| 2009/0036815 A1* | 2/2009 | Ido | ............... | A61H 1/0237 602/23 |
| 2009/0247909 A1* | 10/2009 | Mukumoto | ............... | A43B 7/28 600/592 |
| 2010/0111370 A1* | 5/2010 | Black | ............... | G06K 9/00369 382/111 |
| 2010/0188519 A1* | 7/2010 | Yamaoka | ............... | G06K 9/00369 348/222.1 |
| 2010/0308982 A1* | 12/2010 | Cooperstock | ............... | G06F 3/011 340/407.1 |
| 2011/0009241 A1* | 1/2011 | Lane | ............... | A63B 24/0087 482/8 |
| 2011/0210915 A1* | 9/2011 | Shotton | ............... | G06K 9/00369 345/157 |
| 2012/0000093 A1* | 1/2012 | Pata | ............... | A43B 7/144 36/92 |
| 2012/0016255 A1* | 1/2012 | Masuo | ............... | A61B 5/0809 600/547 |
| 2012/0056800 A1* | 3/2012 | Williams | ............... | G06F 3/011 345/156 |
| 2012/0120073 A1* | 5/2012 | Haker | ............... | G06T 7/0046 345/420 |
| 2012/0219209 A1* | 8/2012 | Shotton | ............... | G06K 9/00335 382/159 |
| 2012/0268493 A1* | 10/2012 | Hayakawa | ............... | A63F 13/06 345/633 |
| 2012/0276994 A1* | 11/2012 | Lansdale | ............... | A63F 13/10 463/31 |
| 2012/0279285 A1* | 11/2012 | Kato | ............... | B21D 5/02 73/65.01 |
| 2012/0303162 A1* | 11/2012 | Orita | ............... | B25J 9/1664 700/275 |
| 2013/0041617 A1* | 2/2013 | Pease | ............... | A43B 3/0005 702/139 |
| 2013/0114851 A1* | 5/2013 | Foote | ............... | G06T 7/004 382/103 |
| 2013/0197375 A1* | 8/2013 | Heise | ............... | A61B 5/024 600/484 |
| 2013/0231822 A1* | 9/2013 | Gouaillier | ............... | B62D 57/032 701/23 |
| 2013/0250050 A1* | 9/2013 | Kanaujia | ............... | H04N 13/0007 348/42 |
| 2013/0259391 A1* | 10/2013 | Kawaguchi | ............... | G06T 7/0044 382/224 |
| 2014/0140596 A1* | 5/2014 | Kawaguchi | ............... | G06T 7/0046 382/128 |
| 2014/0163424 A1* | 6/2014 | Kawaguchi | ............... | G06T 7/0044 600/595 |
| 2015/0055875 A1* | 2/2015 | Kawaguchi | ............... | G06T 7/0083 382/199 |
| 2015/0142381 A1* | 5/2015 | Fitzsimmons | ............... | A47C 7/006 702/166 |
| 2015/0146939 A1* | 5/2015 | Datta | ............... | A01K 67/00 382/110 |
| 2015/0169947 A1* | 6/2015 | Kawaguchi | ............... | G06T 7/0046 382/103 |
| 2015/0182158 A1* | 7/2015 | Ino | ............... | A61B 5/6829 600/557 |
| 2015/0202768 A1* | 7/2015 | Moridaira | ............... | B62D 57/032 700/258 |

OTHER PUBLICATIONS

Takashi Iijima "Introduction to Anatomy for Animation" CG World, vol. 45 dated May 1, 2002.

International Search Report issued in Application No. PCT/JP2012/004278 dated Sep. 11, 2012.

* cited by examiner

POSTURE ESTIMATION DEVICE, POSTURE ESTIMATION METHOD, AND POSTURE ESTIMATION PROGRAM

TECHNICAL FIELD

The present invention relates to a posture estimation apparatus, posture estimation method, and posture estimation program for estimating the posture of a humanoid articulated object such as a human body or a humanoid robot.

BACKGROUND ART

There have been active studies on estimation of human posture based on image data from a captured moving picture. A posture estimation apparatus can determine a person's motions from a moving picture through computer analysis and thus can perform behavior analysis without involving manual works. Applications of behavior analysis include detection of abnormal actions on the street, analysis of in-store purchase behaviors, aid in work efficiency improvement at a factory and form coaching in sports, for instance.

For estimation of a person's posture, it is desirable that the orientation of his/her trunk (i.e., the part from the shoulders to the waist) (which may be referred to as "body orientation" where appropriate) can be estimated. This is because the ability to estimate a person's body orientation would enable determination of the location of an object to which the person is paying attention or estimation of a direction in which the person is about to walk, for example.

It is desirable that such estimation can be performed without attaching an apparatus such as a orientation sensor on a person because an estimation technique requiring attachment of an apparatus on a person is difficult to apply to unspecified persons and is expensive when it targets many subjects.

To address these issues, a technique for estimating the body orientation of a person based on a video picture of the person is described in PTL 1, for example.

The technique described in PTL 1 (hereinafter referred to as "related art technique 1") detects the shoulders and trunk of a person from captured video, analyzes the movement paths of the shoulders and trunk, and determines the person's body orientation from the analyzed movement path. This technique can estimate a person's body orientation without attaching an apparatus such as an orientation sensor on the person.

A technique for estimating the orientation of a person's face based on an image of the person is described in PTL 2, for example.

The technique described in PTL 2 (hereinafter referred to as "related art technique 2") detects the face region of a person from a captured image and matches it against pre-learned patterns, thereby estimating the orientation of the person's face. With this technique, when the face is oriented to the front side of the body, that is, when the face orientation coincides with the body orientation, the body orientation can be estimated without attaching an apparatus such as an orientation sensor on the person.

CITATION LIST

Patent Literature

PTL 1
Japanese Patent Application Laid-Open No. 2003-101999
PTL 2
Japanese Patent Application Laid-Open No. 2004-94491

SUMMARY OF INVENTION

Technical Problem

The aforementioned related art techniques 1 and 2, however, have a problem in that body orientation cannot be accurately estimated depending on image capturing conditions. The related art technique 1 would incorrectly estimate body orientation when the person once stops and makes a turn there or the person is walking backward or sideways, and related art technique 2 would incorrectly estimate body orientation when the face is not oriented to the front side of the body.

The related art techniques 1 and 2 could encounter similar problems when making an estimation on the posture of an articulated object that has a body trunk and walks on two legs, such as a humanoid robot.

An object of the present invention is to estimate the posture of a humanoid articulated object with high accuracy.

Solution to Problem

A posture estimation apparatus according to an aspect of the present invention includes: a head estimation section that estimates a position of a head of a person from image information on an image including the person; a foot estimation section that estimates a position of a foot of the person from the image information, the foot including a sole being parallel with a floor, and a posture estimation section that estimates a posture of the person based on a relative positional relationship between the estimated position of the head and the estimated position of the foot.

A posture estimation method according to an aspect of the present invention includes: estimating, from image information for an image including a person, a position of a head of the person and a position of a foot of the person, the foot including a sole being parallel with a floor; and estimating a posture of the person based on a relative positional relationship between the estimated position of the head and the estimated position of the foot.

A posture estimation program according to an aspect of the present invention is a program causing a computer in an apparatus that receives or generates an image including a person, to perform processes including: estimating, from image information for the image, a position of a position of a head of the person and a position of a foot of the person, the foot including a sole being parallel with a floor; and estimating a posture of the person based on a relative positional relationship between the estimated position of the head and the estimated position of the foot.

Advantageous Effects of Invention

The present invention can estimate the posture of a humanoid articulated object with high accuracy.

DESCRIPTION OF EMBODIMENTS

Embodiments of the present invention will be described in detail with reference to the accompanying drawings. Posture estimation apparatus 100 described below may include a central processing unit (CPU), a storage medium such as read-only memory (ROM) having a control program stored therein, and work memory such as random access memory (RAM), for example. In this case, the functions of the components described below may be realized by the CPU executing the control program.

Embodiment 1

Embodiment 1 of the present invention represents an example of a basic aspect of the present invention.

Figure 1:
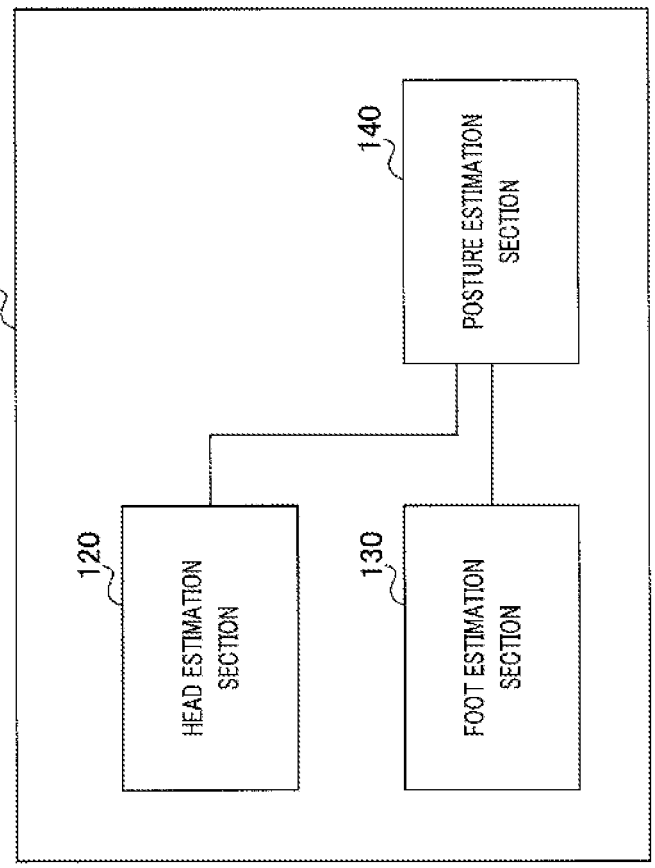
FIG. 1 is a block diagram showing an exemplary configuration of a posture estimation apparatus according to Embodiment 1 of the present invention.

FIG. 1 is a block diagram showing an exemplary configuration of a posture estimation apparatus according to the present embodiment.

In FIG. 1, posture estimation apparatus 100 includes head estimation section 120, foot estimation section 130, and posture estimation section 140.

Head estimation section 120 estimates the position of a person's head from image information for an image including the person.

Foot estimation section 130 estimates the position of the person's foot including sole being parallel with the floor from image information.

Posture estimation section 140 estimates the posture of the person based on the relative positional relationship between the estimated head position and foot position.

Herein, the term "person" means a humanoid articulated object including human body or an articulated object such as a robot. The term "the posture of a person" means the orientation of the front side of a humanoid articulated object or a form corresponding to such an orientation.

Posture estimation apparatus 100 as outlined above can estimate the person's posture based on the relative positional relationship between the head position and the foot position.

When a person walks in a normal posture, that is, with his/her back straight, a sole portion that forms an angle close to parallel with the floor is typically positioned on the trunk-front side (hereinafter referred to as "front side") relative to the head. This is because human feel extend from the heels toward the front side of the body trunk, and the human body has constraints in that the feet can bend only at angles between vertical and a straight line with respect to the lower legs and also the knees can only flex backward.

When a person stands upright, his/her feet extend forward from the heels. In addition, the size of the human feet is larger than the diameter of the head. Accordingly, a sole portion that is positioned at an angle close to parallel with the floor (hereinafter referred to as "parallel with the floor" where appropriate) is located ahead of the head. While the person moves by flexing and stretching the knees and moving the feet alternately, if the heel of the rear foot is kept in contact with the floor, the angle of its ankle becomes acute, making an unnatural posture: the posture is natural with the heel of the rear foot raised.

That is, the angle of the sole of the rear foot changes from an angle close to parallel relative to the floor to the vertical-to-floor side. In contrast, if the front foot is kept in contact with the floor, it is within the ankle's range of motion and does not make the posture unnatural. For these reasons, the angle of the sole of the front foot is more often close to parallel with the floor than the rear foot. When used herein, normal walking with one's back straight is intended to include making a turn after stopping walking, walking backward, and walking sideways.

Use of the relative positional relationship between a foot including a sole being parallel with the floor and the head therefore enables estimation of the person's posture even when the person makes a turn after stopping walking, walks backward, or walks sideways, and when his/her face is not oriented to the front side of the body. Posture estimation apparatus 100 is thus able to estimate the posture of a humanoid articulated object with high accuracy. It is noted that when the floor is horizontal, the term "being parallel with the floor" is equivalent to the term "being horizontal relative to the floor."

Embodiment 2

Embodiment 2 of the present invention represents an example of specific aspects of the present invention as applied to an apparatus which estimates the posture of a person included in a captured image input to the apparatus.

A posture estimation system including the posture estimation apparatus according to the present embodiment will be generally described first.

Figure 2:
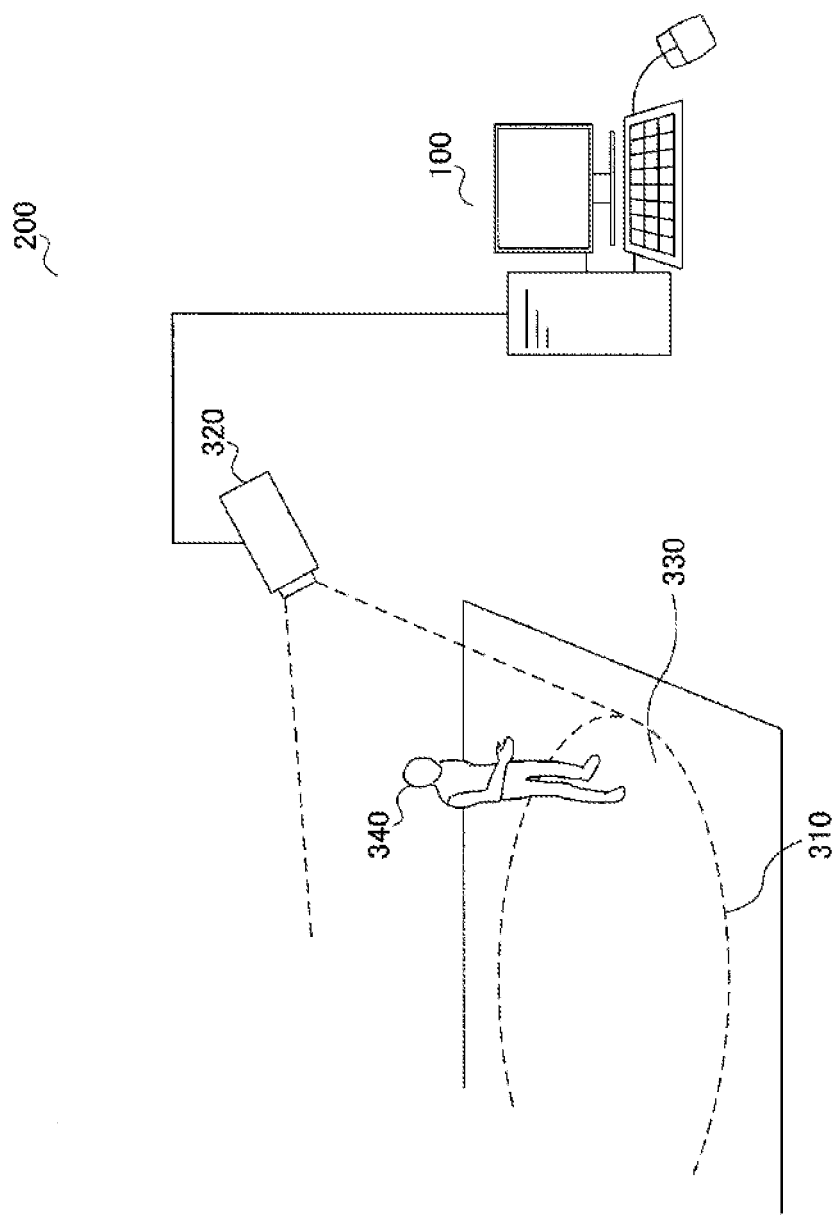
FIG. 2 is a diagram showing an exemplary configuration of a posture estimation system according to Embodiment 2 of the present invention.

FIG. 2 is a diagram showing an exemplary configuration of the posture estimation system in the present embodiment. In FIG. 2, posture estimation system 200 includes monitoring camera 320 for acquiring images of monitored area 310, and posture estimation apparatus 100 communicatively connected with monitoring camera 320.

Monitoring camera 320, which may be a digital video camera for example, acquires video pictures of monitored area 310 from above diagonally. That is, images captured by monitoring camera 320 result from capturing images of a real space that includes person 340 and horizontal floor 330. Monitoring camera 320 then sends video data for captured video to posture estimation apparatus 100. It is assumed here that person 340, which is the subject of posture estimation, is walking on floor 330 of monitored area 310.

Posture estimation apparatus 100 may be a personal computer, for example, and estimates the posture of person 340 based on video data received from monitoring camera 320.

Posture estimation system 200 has been generally described thus far.

Next, the posture of person 340, which is the subject of estimation in the present embodiment, will be described.

Figure 3:
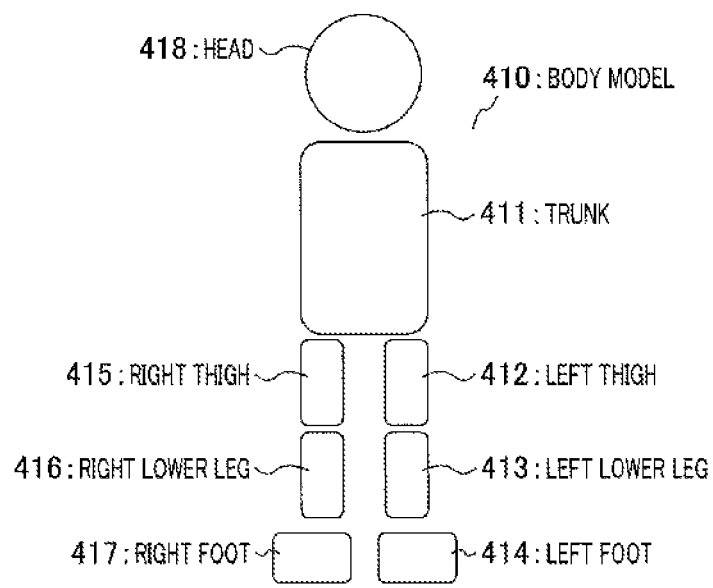
FIG. 3 shows an example of a body model in Embodiment 2 of the present invention.

FIG. 3 illustrates an example of structure model 410 for the body of person 340 (hereinafter referred to as "body model"). Body model 410 is a schematic representation of positional relationships among body parts used in posture estimation. Body model 410 includes at least trunk 411, left thigh 412, left lower leg 413, left foot 414, right thigh 415, right lower leg 416, right foot 417, and head 418.

These parts are connected by joints, so their ranges of motion are limited by other parts. For instance, left foot 414 can move only within a certain angle range about the point at which left foot 414 is connected with left lower leg 413. In the present embodiment, posture estimation apparatus 100 extracts the region of each part of body model 410 from image information using constraints of the range of motion of the individual parts. Note that the body model for use by posture estimation apparatus 100 is not limited to the example shown in FIG. 3.

The present embodiment assumes that person 340 stands upright or walks on floor 330, and the posture to be estimated is represented by horizontal direction components contained in the orientation of the front side of the body trunk (or trunk 411) of person 340 (hereinafter referred to as "body orientation"). The following descriptions therefore will not consider vertical component direction.

Figure 4:
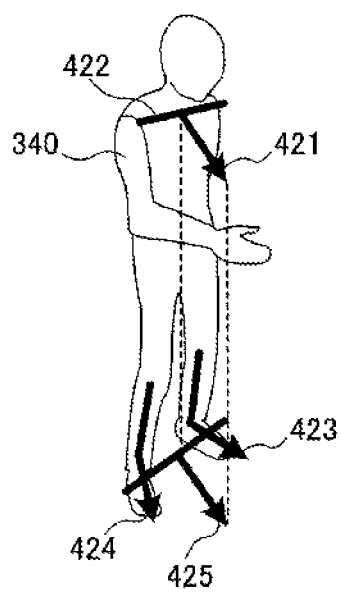
FIG. 4 is a diagram for describing the definition of body orientation in Embodiment 2 of the present invention.

FIG. 4 is a diagram for describing the definition of body orientation in the present embodiment. As shown in FIG. 4, body orientation 421 represents the orientation of a line segment that is orthogonal in three-dimensional space to line segment 422 connecting the left and right shoulders of person 340 in which the left and right feet are oriented.

For estimation of body orientation, average feet orientation 425 may be used, for example, which is determined by averaging left foot orientation 423 and right foot orientation 424. Due to body constraints, average feet orientation 425 approximates to body orientation 421 when person 340 assumes a natural posture with his/her feet in contact with the floor. For posture estimation, therefore, the orientations of the left and right feet may be extracted and averaged.

Depending on the shape or color of clothes person 340 is wearing, however, body parts cannot be extracted from image information, in which case foot orientations are difficult to detect.

It is also conceivable to perform posture estimation by applying the related art techniques listed above. As already mentioned, however, the related art techniques are not able to estimate posture when person 340 is walking backward or has its face turned to a side.

To address these issues, posture estimation apparatus 100 in the present embodiment estimates person's posture based on the relative positional relationship between the head position and foot position as discussed later. Thus, posture estimation apparatus 100 can estimate the posture of person 340 more reliably (or with high accuracy).

The posture of person 340 as the subject of estimation has been thus far described.

The configuration of posture estimation apparatus 100 will be described next.

Figure 5:
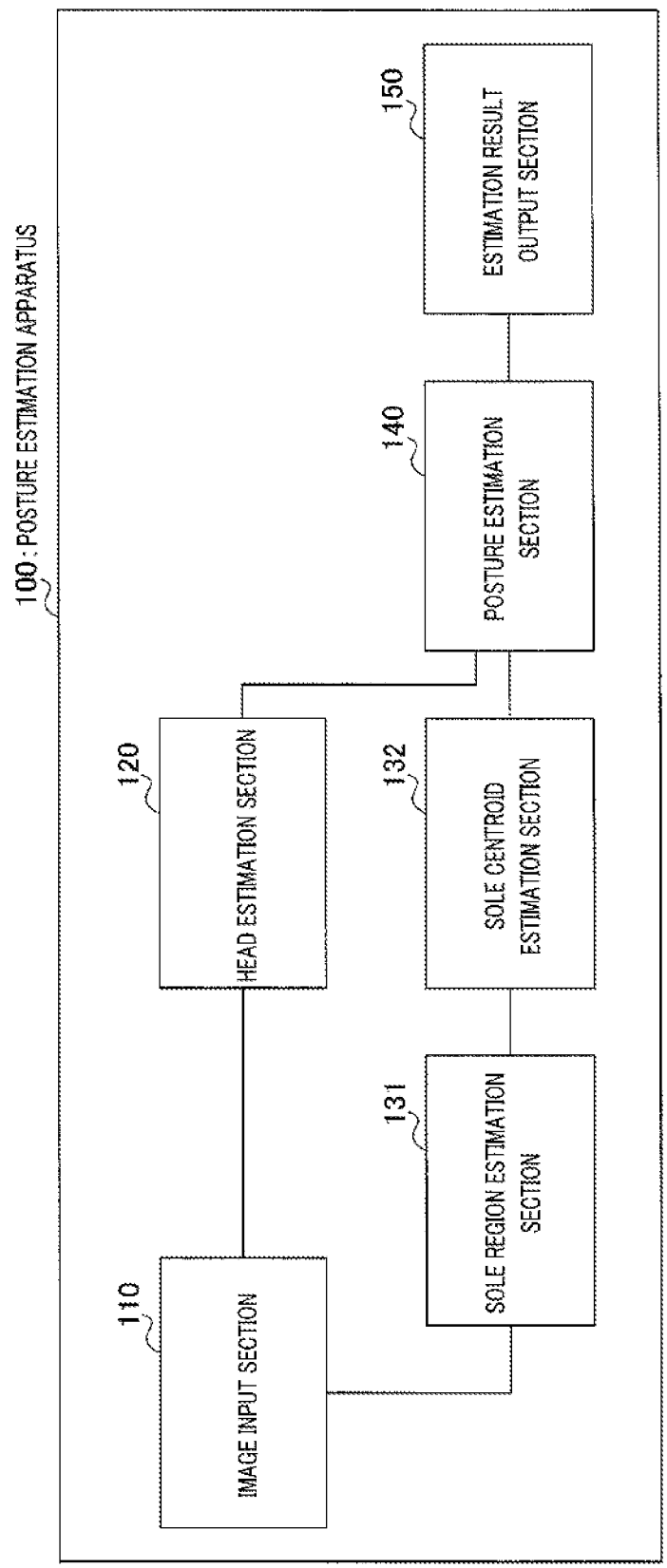
FIG. 5 is a block diagram showing an exemplary configuration of the posture estimation apparatus according to Embodiment 2 of the present invention.

FIG. 5 is a block diagram showing an exemplary configuration of posture estimation apparatus 100. In FIG. 5, posture estimation apparatus 100 includes image input section 110, head estimation section 120, sole region estimation section 131, sole centroid estimation section 132, posture estimation section 140, and estimation result output section 150. Sole region estimation section 131 and sole centroid estimation section 132 correspond to foot estimation section 130 of Embodiment 1.

Image input section 110 receives an image including person 340 and floor 330.

More specifically, image input section 110 receives image data for video captured by monitoring camera 320. Image input section 110 then sequentially outputs image data for still images (hereinafter referred to as "frames") serving as units forming the video to head estimation section 120 and sole region estimation section 131.

Head estimation section 120 estimates the position of the head of person 340 from image information of the video.

Specifically, head estimation section 120 estimates a head region in the image from image data input to it, and determines the centroid position of the estimated head region (hereinafter referred to as "head centroid position") as the position of person 340's head. Head estimation section 120 then outputs information indicating where the estimated head centroid position is located in the horizontal direction in the image (hereinafter referred to as "head position information") to posture estimation section 140.

Sole region estimation section 131 estimates a sole region (hereinafter referred to as "sole region") of person 340 in the image from image information for the image.

Specifically, sole region estimation section 131 estimates the boundary between a foot of person 340 and the background in the image (hereinafter referred to as "sole boundary") from input image data, and estimates a sole region based on the estimated sole boundary. Sole region estimation section 131 also estimates the sole angle of the estimated sole boundary. Sole angle refers to the angle formed by the sole boundary with the horizontal direction, which is the reference direction.

Sole region estimation section 131 then outputs sole angle information and foot position information in association with each other to sole centroid estimation section 132. Here, sole angle information refers to information that indicates the estimated sole angle, and foot position information is information that indicates the position of the estimated sole region within the image.

Details of how to estimate the sole boundary and sole region will be described later. Note that sole region as used herein does not mean a region of an image of a sole but a region that corresponds to the position (or range) of a sole.

From an estimated sole region, sole centroid estimation section 132 estimates a centroid position (hereinafter referred to as "foot centroid position") of a region of the estimated sole region that is at an angle close to horizontal (hereinafter referred to simply as "horizontal"), and sets the estimated foot centroid position as the position of the foot.

Specifically, sole centroid estimation section 132 estimates the foot centroid position from the sole angle information and foot position information input to it. Sole centroid estimation section 132 then outputs information indicating where the estimated foot centroid position is located in the horizontal direction in the image (hereinafter referred to as "foot centroid position information") to posture estimation section 140.

Posture estimation section 140 estimates the posture of person 340 based on the relative positional relationship between the estimated head position and foot position.

Specifically, posture estimation section 140 determines on which side of the head centroid position the foot centroid position is located in the horizontal direction in real space, from the head position information and foot centroid position information input to it. Posture estimation section 140 then estimates that the determined side in horizontal direction (or left-right direction) in the real space is the front side of person 340.

Estimation result output section 150 outputs the result of posture estimation performed by posture estimation section 140.

Specifically, posture estimation section 140 includes a display apparatus such as a liquid crystal display, for example. Posture estimation section 140 provides information indicating the estimated posture if a posture has been successfully estimated or information indicating a failure in estimation when a posture has not been estimated through display of characters or an image.

Posture estimation apparatus 100 having such features can estimate the head centroid position and foot centroid position of person 340 from video frames and estimate the posture of person 340 based on the relative positional relationship between those positions. Posture estimation apparatus 100 thereby can estimate the posture of person 340 with high accuracy as mentioned above.

The sole boundary in a portion of sole regions of person 340's feet that is close to horizontal is often a portion positioned at an angle close to the horizontal line in the image. In other words, the direction of a sole boundary corresponding to person 340's foot that is closer to horizontal or a portion of a sole close to horizontal (hereinafter referred to as "boundary direction") approximates to the horizontal direction. This is because floor 330 is horizontal in the present embodiment. In this situation, the relative relationship of sole angles of person 340 is maintained even when person 340 is not positioned exactly sideways relative to the camera.

In addition, a region at an angle close to horizontal forms a smaller angle with floor 330 than a region at an angle not close to horizontal.

Thus, by using a sole region with more components in the boundary direction approximates to the horizontal direction than another sole region, the foot centroid position can be determined from the sole region positioned at an angle that is close to the angle of floor 330. This leads to improved accuracy of posture estimation.

In the present embodiment, sole centroid estimation section 132 therefore estimates the foot centroid position using only a sole region having many components in the boundary direction approximating to the horizontal direction among sole regions estimated for the individual feet.

The configuration of posture estimation apparatus 100 has been thus far described.

Figure 6:
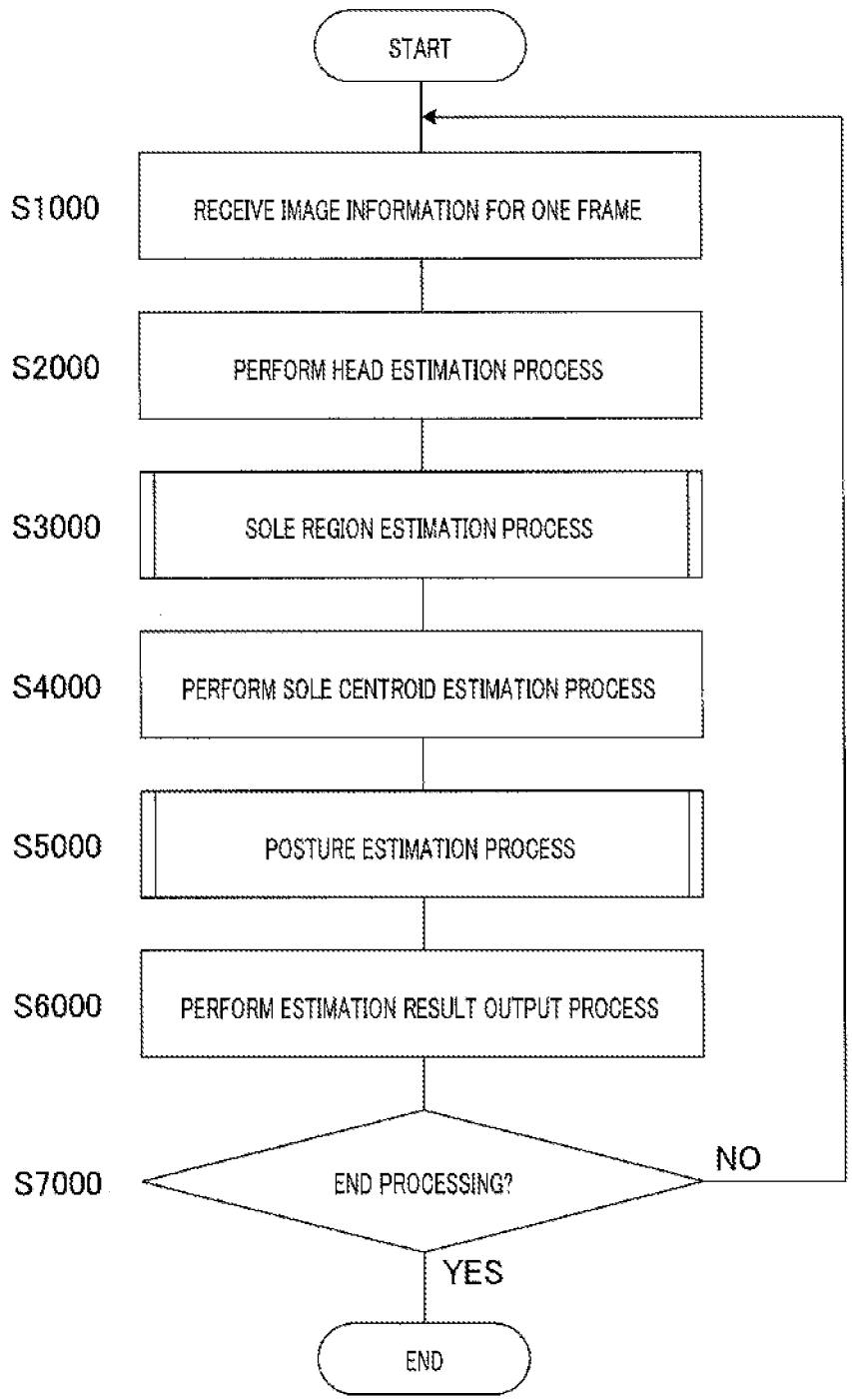
FIG. 6 is a flowchart illustrating an exemplary operation of the posture estimation apparatus according to Embodiment 2 of the present invention.

The operation of posture estimation apparatus 100 will be described next FIG. 6 is a flowchart illustrating an exemplary operation of posture estimation apparatus 100.

At step S1000, image input section 110 first receives image data for one frame.

At step S2000, head estimation section 120 performs a head estimation process, which is a process to generate the head position information described above.

Exemplary methods for extracting the head region and estimating the head centroid position will now be described.

Head estimation section 120 first generates a background difference image from input image data and extracts a region which is estimated to represent person 340 (hereinafter referred to as "person candidate region"). A background difference image is an image indicating the difference between a background image captured without person 340 and a newly input image.

Figure 7:
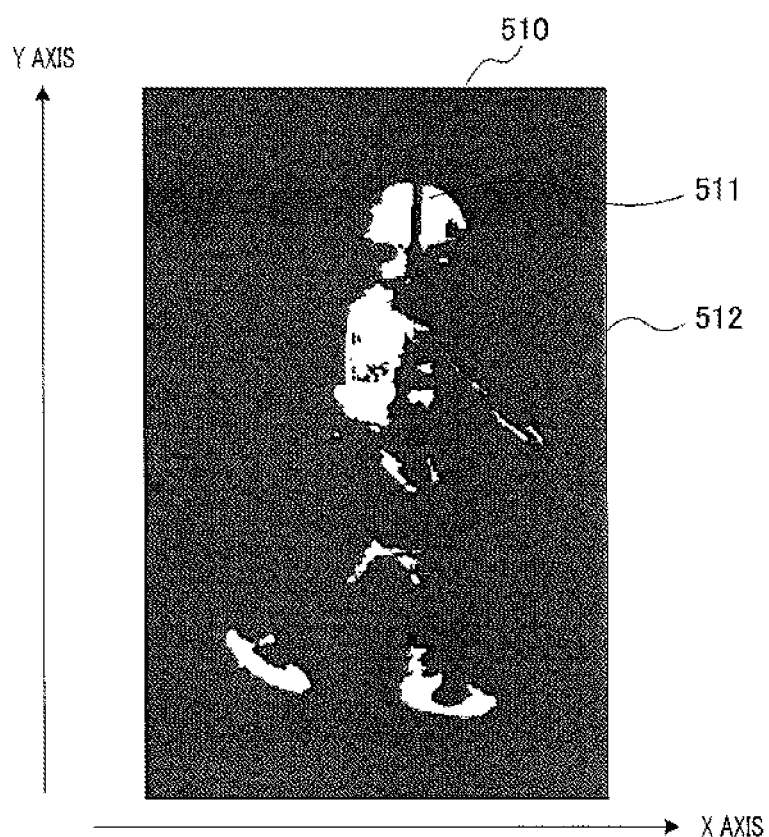
FIG. 7 illustrates an example of a background difference image in Embodiment 2 of the present invention.

FIG. 7 illustrates an example of the background difference image.

As shown in FIG. 7, background difference image 510 represents pixels that have different values in the input image and the background image in white color, and represents pixels that have the same values in the input image and the background image in black color. That is, background difference image 510 represents a region in which person 340 is present as white region 511 and a region in which person 340 is not present as black region 512.

Depending on the shape or color of the clothes that person 340 is wearing, regions of right thigh 415, right lower leg 416, left thigh 412, and left lower leg 413 (see FIG. 3) could not be properly extracted as shown in FIG. 7. Also, depending on the shape or color of shoes, the shapes of right foot 417 and left foot 414 (see FIG. 3), especially the shape of the tops of the feet, can vary.

As can be seen in FIG. 7, however, background difference image 510 relatively stably represents the shapes of the head and the soles (i.e., portions on the bottom side of shoes).

Head estimation section 120 generates background difference image 510 by prestoring a background image and calculating the difference between the background image and an input image. Alternatively, head estimation section 120 may generate background difference image 510 by extracting a region representing a moving object. A moving object region may be extracted by identifying stationary objects and moving objects from the difference between the immediately preceding frame and the current frame, for example.

Head estimation section 120 extracts white region 511 as a person candidate region and extracts an upper region of white region 511 as a head candidate region. The upper region is predefined as a region that covers a predetermined proportion (e.g., 30%) of the person candidate region (or white region 511) from its upper edge downward, for example.

Head estimation section 120 then extracts a head region from the extracted head candidate region through Hough transform, for example. Hough transform is a well-known technique, capable of determining three parameters representing the center of a circle (X and Y coordinates) and its radius from edge information. Head estimation section 120 then calculates the center of a circle thus determined as the head centroid position.

Head estimation section 120 does not necessarily have to perform the processing at step S2000 before step S3000 (which is described later) but may perform step S2000 by the start of step S4000.

At step S3000 in FIG. 6, sole region estimation section 131 performs sole region estimation process, which is a process to generate the sole angle information and foot position information described above from input image data for person 340 included in the image data.

Figure 8:
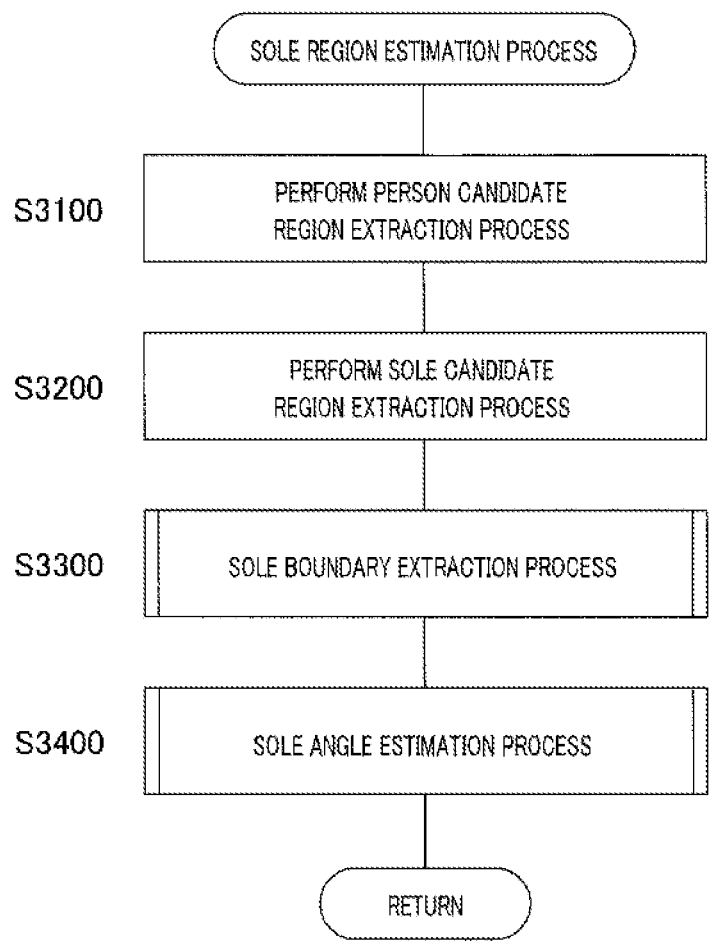
FIG. 8 is a flowchart illustrating an exemplary sole region estimation process in Embodiment 2 of the present invention.

FIG. 8 is a flowchart illustrating an exemplary sole region estimation process (step S3000 in FIG. 6).

At step S3100, sole region estimation section 131 first extracts a person candidate region from input image data.

Specifically, sole region estimation section 131 extracts a person candidate region using the extraction scheme described in FIG. 7, for example. Head estimation section 120 and sole region estimation section 131 may share the results of person candidate region extraction.

At step S3200, sole region estimation section 131 extracts a lower region of the extracted person candidate region as a sole candidate region. A sole candidate region is a region estimated to include sole regions in their entirety. The lower region is predefined as a region that covers a predetermined proportion (e.g., 25%) of the person candidate region from its bottom edge upward, for example.

Figure 9:
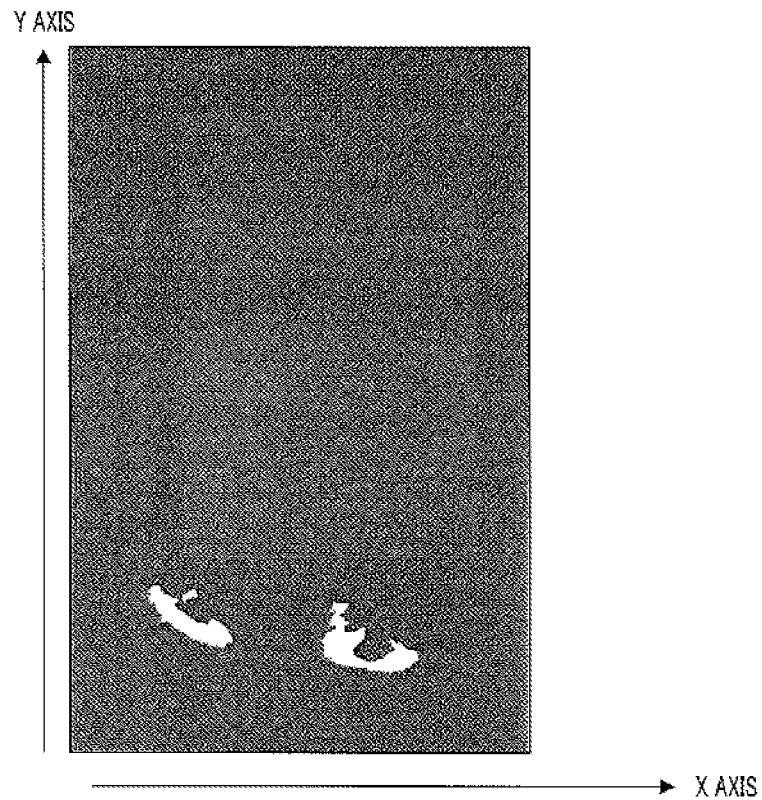
FIG. 9 illustrates an example of the partial background difference image in Embodiment 2 of the present invention.
Figure 10:
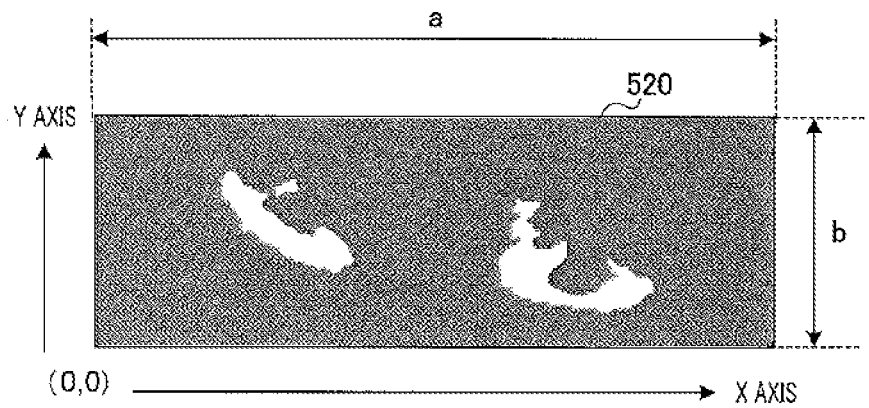
FIG. 10 illustrates a sole candidate region in Embodiment 2 of the present invention.

FIG. 9 shows an exemplary image in which the portions other than a sole candidate region are ignored in the background difference image; and FIG. 10 is an enlarged view of the sole candidate region in the background difference image shown in FIG. 9.

As shown in FIG. 10, sole candidate region 520 measures a in the horizontal direction and b in the direction vertical to the horizontal line, for example. In other words, a is the maximum value of the X coordinate of sole candidate region 520 and b is the maximum value of the Y coordinate.

Here, the lower left corner of sole candidate region 520 is defined as the origin, where X axis represents the horizontal direction and Y axis represents the vertical direction. In this case, the position of each pixel in sole candidate region 520 is represented by a pair of an X coordinate value x and a Y coordinate value y (x,y), where $0<=x<=a$ and $0<=y<=b$.

The following descriptions assume that the X-axis direction coincides with the horizontal direction in an image.

Although the position of pixels of sole candidate region 520 is described here as being represented with a local coordinate system of sole candidate region 520, pixel position may be represented using a global coordinate system of the input image or the like. Coordinate values can be converted between a local coordinate system and a global coordinate system by use of the position of the origin of the local coordinate within the global coordinate system.

At step S3300 in FIG. 8, sole region estimation section 131 performs sole boundary extraction process, which is a process to extract pixels making up a sole boundary (hereinafter referred to as "sole boundary pixels") from a sole candidate region and generate information that indicates the positions of the sole boundary pixels (hereinafter referred to as "sole position information").

While a sole of person 340 is the underside of the shoe or top of the foot, at least a lower portion of its outline can be equated with the outline of the foot including the shoe. This is because the soles typically face the ground side such as when one is walking. In addition, a sole candidate region is a portion of the background difference image, and the outline of the person candidate region (the white pixel region in FIG. 10) within the sole candidate region can be equated with the outline of the feet including shoes.

In this respect, sole region estimation section 131 extracts a lower portion of the outline of the person candidate region (the white pixel region in FIG. 10) from the sole candidate region as the sole boundary.

In the local coordinate system shown in FIG. 10, among the pixels included in one sole region, a pixel having the smallest Y coordinate value among pixels having the same X coordinate value can be considered to be a sole boundary pixel. The Y coordinate value of a sole boundary pixel included in one sole region is uniquely determined from its X coordinate value.

Figure 11:
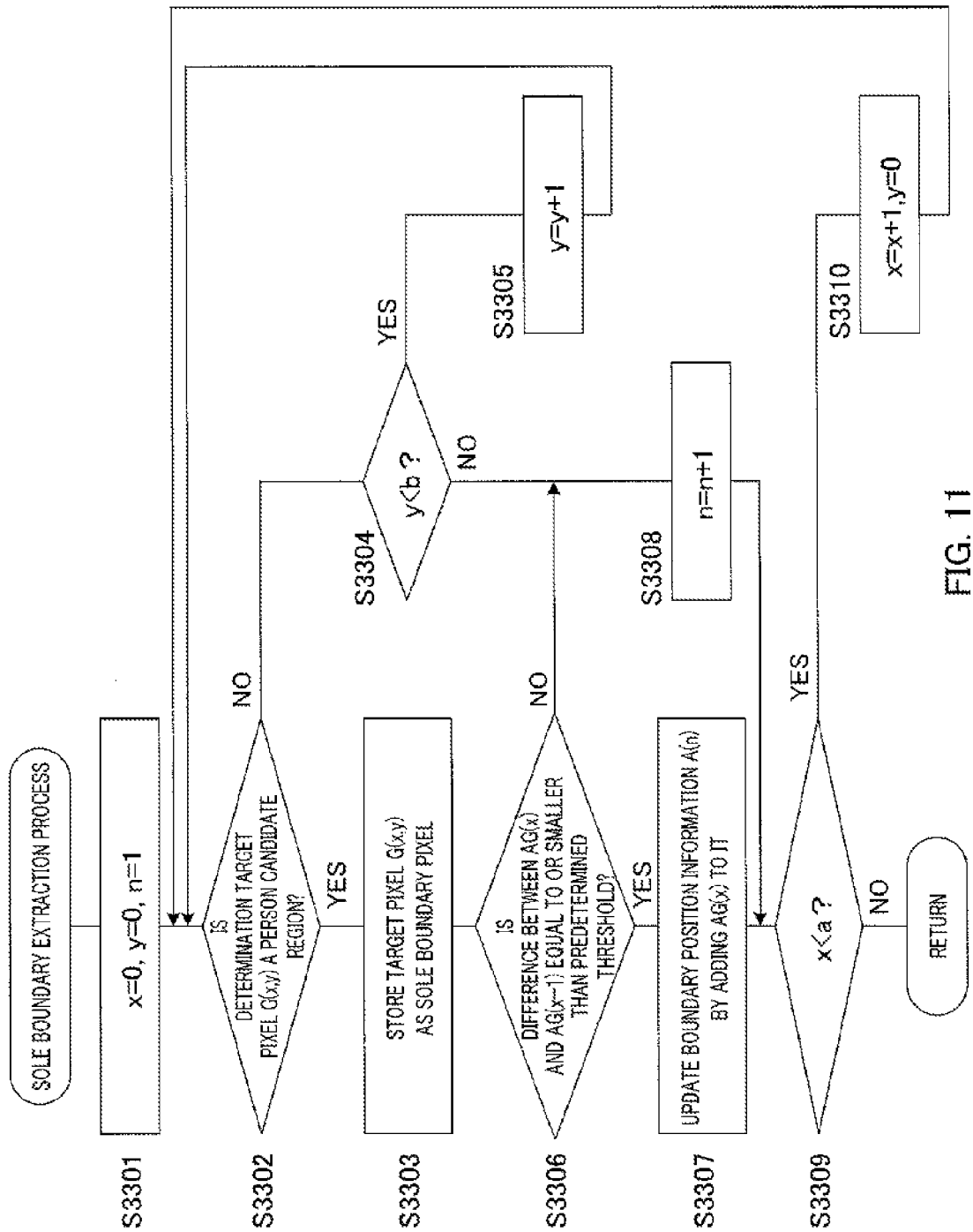
FIG. 11 is a flowchart illustrating an example of a sole region extraction process in Embodiment 2 of the present invention.

FIG. 11 is a flowchart illustrating an example of the sole region extraction process (step S3300 in FIG. 8).

In the description that follows, a pixel for which determination is made about inclusion in a sole region will be called "target pixel." When the target pixel is at coordinates (x, y), it is represented as G(x,y). The value of a pixel (white pixels in FIG. 10) positioned inside a person candidate region is represented as T, and the value of a pixel positioned outside the person candidate region (black pixels in FIG. 10) is represented as F. By way of example, when the target pixel at coordinates (2, 3) belongs to the person candidate region, that pixel is represented as G(2,3)=T.

When a sole boundary pixel is present at the position of X coordinate value x, the Y coordinate value of the pixel (hereinafter referred to as "boundary vertical position") is represented as AG(x). For example, when the Y coordinate value of a sole boundary pixel having an X coordinate value of 3 is 7, its boundary vertical position is represented as AG(3)=7.

It is possible that more than one sole region is estimated from one sole candidate region because a human being typically walks on two legs. The sole boundary of the nth sole region extracted is represented as A(n). When a sole boundary pixel having an X coordinate value of x is included in the nth sole region, the sole boundary pixel is represented as A(n)=AG(x).

By way of example, assume that the first sole region extracted includes a sole boundary pixel having an X coordinate value of 6, a sole boundary pixel having an X coordinate value of 7, and a sole boundary pixel having an X coordinate value of 8. In this case, sole position information for the first sole region is represented as A(1)={AG(6), AG(7), AG(8)}. When there are two or more sole regions, the sole regions are represented as A={A(1),A(2)}.

At step S3301, sole region estimation section 131 sets the initial position of the target pixel. For example, sole region estimation section 131 sets the lower left corner (0,0) of sole candidate region 520 as the initial position of the target pixel as illustrated in FIG. 10.

Sole region estimation section 131 also newly defines the first (n=1) sole region(1)=0. Consequently, sole region estimation section 131 sets x=0, y=0, and n=1. The first sole region (1)=0 means that no sole boundary region has been obtained.

At step S3302, sole region estimation section 131 determines whether the current target pixel is included in the person candidate region.

Specifically, sole region estimation section 131 determines that the target pixel is included in a sole region if the target pixel is white (G(0,0)=T), for example. Sole region estimation section 131 determines that the target pixel is not included in a sole region if the target pixel is black (G(0,0)=F).

If sole region estimation section 131 determines that the target pixel is included in a sole region (S3302: YES), it proceeds to step S3303. If sole region estimation section 131 determines that the target pixel is not included in a sole region (S3302: NO), it proceeds to step S3304.

At step S3303, sole region estimation section 131 stores the target pixel G (x,y) as a sole boundary pixel and proceeds to step S3306, which is described later.

At step S3304, sole region estimation section 131 determines whether the Y coordinate value of the target pixel is smaller than the maximum value b of the Y coordinate of the sole candidate region (y<b).

If sole region estimation section 131 determines that y of the target pixel is smaller than b (S3304: YES), it proceeds to step S3305. If sole region estimation section 131 determines that y of the target pixel is not smaller than b (S3304: NO), it proceeds to step S3308, which is described later.

At step S3305, sole region estimation section 131 increments the Y coordinate value of the target pixel by one (y=y+1), and then returns to step S3302. That is, sole region estimation section 131 moves the target pixel G (x,y) by one in Y-axis direction.

At step S3306, sole region estimation section 131 determines whether there is any sole boundary pixel in the neighboring pixel sequence on the origin side in X-axis direction. If there is such a sole boundary pixel, sole region estimation section 131 determines whether the current target pixel can form the same sole boundary with the sole boundary pixel in the neighboring pixel sequence.

More specifically, sole region estimation section 131 determines whether the absolute value of the difference between the boundary vertical position AG(x) of the current target pixel G (x,y) and the boundary vertical position AG(x−1) of the neighboring pixel sequence is equal to or smaller than predetermined threshold D.

If sole region estimation section 131 determines that the absolute value of the difference between the boundary vertical positions AG(x) and AG(x−1) is equal to or smaller than threshold D (|AG(x)−AG(x−1)|≤a) (S3306: YES), it proceeds to step S3307. Sole region estimation section 131 also proceeds to step S3307 when no sole boundary pixel is present in the neighboring pixel sequence (i.e., when boundary vertical pixel position AG (x−1) does not exist). If the absolute value of the difference between the boundary vertical positions AG(x) and AG(x−1) exceeds threshold D (|AG(x)−AG(x−1)|>a)(S3306: NO), sole region estimation section 131 proceeds to step S3308.

At step S3307, sole region estimation section 131 updates the currently stored sole position information A(n) by adding sole boundary pixel AG (x) thereto and proceeds to step S3309, which is described later. This is because it is likely that the pixel at the boundary vertical position AG(x) and the pixel at AG(x−1) form the same sole boundary.

At step S3308, sole region estimation section 131 saves the currently stored sole position information A(n) and newly defines the next nth sole position information A(n), and then proceeds to step S3309. That is, sole region estimation section 131 increments n by one (n+1). This is because it is not likely that the pixel at the boundary vertical position AG(x) and the pixel at AG(x−1) form the same sole boundary.

Sole region estimation section 131 may optionally perform assessment process for assessing the reliability of the sole position information that was stored last time as information indicating the sole boundary prior to newly defining sole position information. This is because a pixel detected as a sole boundary pixel can result from noise and actually not form a sole boundary.

For such assessment, sole region estimation section 131 may determine whether the difference between the maximum and minimum values of the X coordinate of the sole boundary pixel included in the sole position information that was stored last time is greater than a predetermined value, for example. If the difference is smaller than the predetermined value, sole region estimation section 131 may decide that the detected sole boundary pixel is likely to result from noise and delete the last position information. Thereby, sole region estimation section 131 can improve the accuracy of sole region estimation.

At step S3309, sole region estimation section 131 determines whether the X coordinate value x of the target pixel is smaller than the maximum value a of the X coordinate of the sole candidate region (x<a).

If x of the target pixel is smaller than a (S3309: YES), sole region estimation section 131 proceeds to step S3310. If x of the target pixel is not smaller than a (S3304: NO), sole region estimation section 131 returns to the process of FIG. 8.

At stop S3310, sole region estimation section 131 increments the X coordinate value of the target pixel by one (x=x+1), sets the Y coordinate value of the target pixel to zero (y=0), and returns to step S3302. That is, sole region estimation section 131 moves the target pixel G (x,y) by one in X-axis direction and also returns it to the origin of Y-axis direction.

In this manner, sole region estimation section 131 can generate sole position information from the sole candidate region for each sole region, i.e., for each foot.

Once the position of the sole boundary (i.e., the position of the sole boundary pixel) is determined, the person candidate region in the sole candidate region (the white pixel region in FIG. 10) positioned above the sole boundary can be determined to be a sole region.

Put differently, sole region estimation section 131 estimates the position of a sole region through estimation of sole boundary position. Posture estimation apparatus 100 thus can perform posture estimation based on the position of estimated sole regions.

As will be understood from FIGS. 9 and 10, however, it is difficult to discriminate between the heel side and the toe side only from the sole region position.

To address this, posture estimation apparatus 100 estimates the person's posture based on the relative positional relationship between the head position and the position of a foot including a sole being parallel with the floor (e.g., a foot in contact with the floor) as mentioned above. Posture estimation apparatus 100 determines the centroid position of a sole region having many components in the boundary direction approximating to the horizontal direction as the position of the foot including a sole being with the floor. Put differently, posture estimation apparatus 100 estimates the sole region centroid after assigning a weighting to the entire sole region such that a larger weighting is assigned to a sole region with its boundary direction approximating to horizontal direction (i.e., a sole region having a sole angle close to zero).

Sole region estimation section 131 thus estimates the sole angle of each estimated sole region.

At step S3400 in FIG. 8, sole region estimation section 131 performs sole angle estimation process, which is a process to extract the sole angle of each estimated sole region.

Definition of sole angle in the present embodiment is now described.

Figure 12:
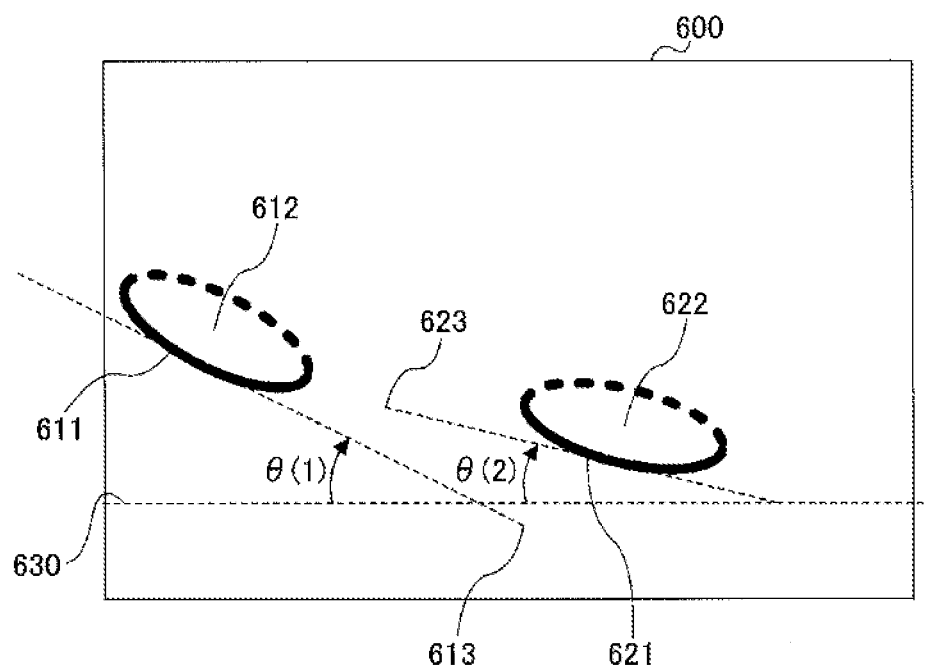
FIG. 12 is a diagram for describing the definition of sole angle in Embodiment 2 of the present invention.

FIG. 12 is a diagram for describing the definition of sole angle in the present embodiment.

As shown in FIG. 12, assume that first sole region 612 including first sole boundary 611 and second sole region 622 including second sole boundary 621 have been extracted from sole candidate region 600, which is a two-dimensional image. In the figure, the sole regions are schematically represented by ellipses.

Posture estimation apparatus 100 sets reference direction 630, which corresponds to the horizontal direction of the image, in sole candidate region 600. Reference direction 630 may be preset according to camera parameters, such as the installation angle of monitoring camera 310 (see FIG. 2) for example.

Posture estimation apparatus 100 then defines the sole angle of first sole region 612 (or first sole boundary 611) as the first angle θ1, which is the angle between first direction 613 which is the direction of first sole boundary 611 and reference direction 630. Posture estimation apparatus 100 also defines the sole angle of second sole region 622 (or second sole boundary 621) as second angle θ2, which is the angle between second direction 623 that is the direction of second sole boundary 621, and reference direction 630.

The present embodiment assumes that the sole angle is an angle in a two-dimensional input image. Accordingly, body orientation estimated with sole angles is two-dimensionally defined in the input image. A body orientation thus two-dimensionally defined may be converted to a body orientation in a three-dimensional real space based on installation parameters of monitoring camera 320 or the like.

Figure 13:
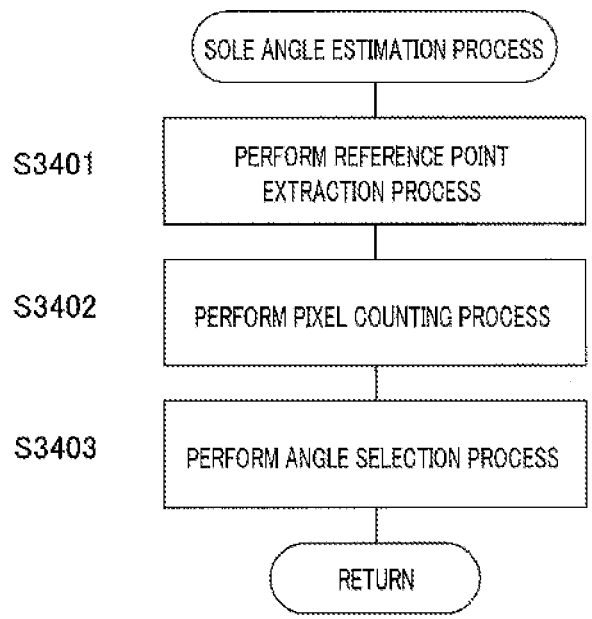
FIG. 13 is a flowchart illustrating an exemplary sole angle estimation process in Embodiment 2 of the present invention.

FIG. 13 is a flowchart illustrating an exemplary process of sole angle estimation (step S3400 in FIG. 8).

The process is described for a case where the sole angle is determined for a single sole region. When there are more than one sole region, sole region estimation section 131 repeats the process per sole region. That is, when multiple sole regions have been extracted, sole region estimation section 131 repeats the process described below to extract sole angle θ(n) for each sole region (n).

At step S3401, sole region estimation section 131 first performs reference point extraction process, which is a process to extract a rotation reference point to serve as the reference for rotating a rectangle used for estimation discussed below, from a sole boundary.

Figure 14:
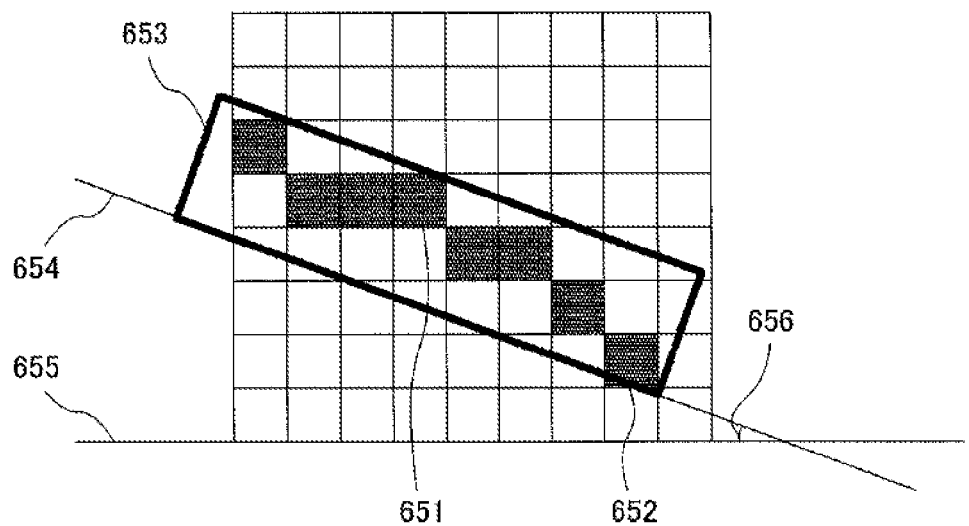
FIG. 14 is a diagram for illustrating a reference point extraction process in Embodiment 2 of the present invention.

FIG. 14 is a diagram for illustrating the reference point extraction process. In the figure, black pixels indicate sole boundary pixels that form a sole boundary while white pixels indicate pixels other than the sole boundary pixels.

By way of example, assume that sole boundary that slopes down from left to right 651 has been extracted as shown in FIG. 14. In this case, sole region estimation section 131 selects the rightmost pixel 652 having the smallest Y coordinate value from the sole boundary pixels forming sole boundary 651. Sole region estimation section 131 then sets rectangle 653 for estimating the sole angle with reference to pixel 652, i.e., the rotation reference point.

Specifically, sole region estimation section 131 positions rectangle 653 of a predetermined size such that one of its vertices coincides with the rotation reference point. Sole region estimation section 131 may fix the size of rectangle 653 at a predetermined value or may vary its size as a function of the size of the person candidate region.

As described later, sole region estimation section 131 rotates rectangle 653 about the rotation reference point. The angle of rectangle 653 is defined by angle 656 which is formed between rectangle baseline 654 which represents the direction in which the long side of rectangle 653 that passes through the rotation reference point extends and reference direction 655 corresponding to the horizontal direction.

Then, at step S3402 in FIG. 13, sole region estimation section 131 rotates rectangle 653 by a predetermined angle, and counts the number of sole boundary pixels included in rectangle 653. If rectangle 653 is rotated in steps of 10 degrees, 36 pixel counts will be obtained since one rotation equals 360 degrees. For each sole region, sole region estimation section 131 stores a pair of a rotation angle and the pixel count of sole boundary pixels at that angle in the form of a list.

At step S3403, sole region estimation section 131 selects sole angle θ(n) based on the pair list. Then, sole region estimation section 131 generates sole angle information indicating the selected sole angle θ(n) and returns to the process of FIG. 8.

Specifically, sole region estimation section 131 sets the rotation angle at which the largest pixel count was obtained as the sole angle of the sole region (sole boundary). If there are two or more rotation angles at which the largest pixel count was obtained, sole region estimation section 131 may set the average of those rotation angles as the sole angle. Alternatively, sole region estimation section 131 may set an average angle determined by assigning a weighting to rotation angles according to the corresponding pixel counts as the sole angle.

Posture estimation apparatus 100 then returns to the process of FIG. 6.

At step S4000 in FIG. 6, solo centroid estimation section 132 performs sole centroid estimation process, which is process to estimate foot centroid position based on sole position information and sole angle information (A(n),θ(n)) and generate foot centroid position information.

Specifically, sole centroid estimation section 132 sets the centroid of sole boundary pixels of the sole region whose boundary direction is closer to the horizontal direction angle as foot centroid position C. This is because when there are two sole regions, the centroid of the body weight is likely to be located in one of the sole regions that has a sole angle closer to horizontal.

Sole centroid estimation section 132 calculates the foot centroid position C of the sole region whose boundary direction is closer to the horizontal direction angle using equation (1) below, for example, where k represents the number of sole boundary pixels, AG(m) represents the boundary vertical position of the mth sole boundary pixel, and AGK(m) represents the X coordinate value of the mth sole boundary pixel.

[1]

$$C = \left( \frac{\sum_{m=1}^{k} AGK(m)}{k}, \frac{\sum_{m=1}^{k} AG(m)}{k} \right)$$ (Equation 1)

In the example shown in FIG. 10, the second angle θ2 is closer to zero degree than the first angle θ1. This means that the boundary direction of second sole region 622 (first sole boundary 621) is closer to the horizontal direction than the boundary direction of first sole region 612 (first sole boundary 611). In this case, therefore, sole centroid estimation section 132 decides that the center of the mass of the body weight is located in second sole region 622 and sets the centroid of second sole region 622 as the foot centroid position.

In this manner, from an estimated sole regions, sole region estimation section 131 can estimate the foot centroid position, which is the centroid position of one of the sole regions that is parallel with the floor.

If the two sole regions have the same sole angle, sole centroid estimation section 132 may set the centroid position of the total of the sole regions as the foot centroid position.

If three or more sole regions are extracted (n>2), sole region estimation section 131 may extract two of them that satisfy a certain condition. The certain condition may be being at a predetermined position, being larger than a predetermined size, or having the largest or second largest area, for example. By extracting sole regions according to multiple established conditions, sole region estimation section 131 can extract sole regions with precision in accordance with the quality of input image data.

Sole region estimation section 131 may also store input image data and an estimation result in association with each other.

At step S5000, posture estimation section 140 performs posture estimation process, which is a process to perform posture estimation based on the head position information generated at step S2000 and the foot centroid position information generated at step S4000.

Figure 15:
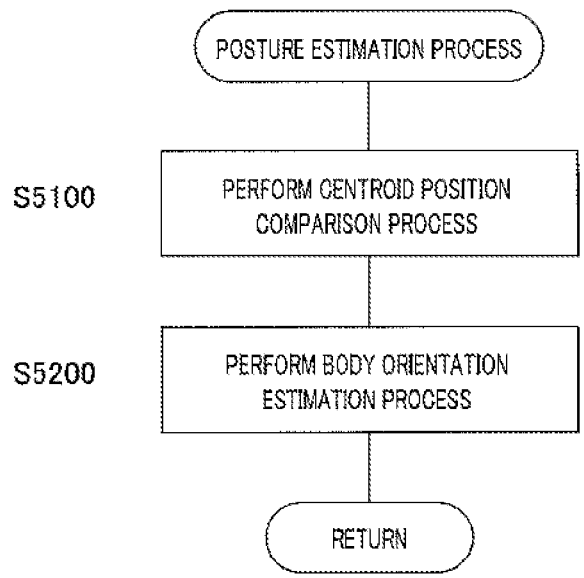
FIG. 15 is a flowchart illustrating an exemplary posture estimation process in Embodiment 2 of the present invention.

FIG. 15 is a flowchart illustrating an exemplary posture estimation process (step S5000 in FIG. 6).

At step S5100, posture estimation section 140 performs centroid position comparison, in which the relative positional relationship between the head centroid position and the foot centroid position is determined.

Specifically, posture estimation section 140 compares the X-axis coordinate value of the head centroid position with the X-axis coordinate value of the foot centroid position and determines whether the direction from the head centroid position to the foot centroid position (hereinafter referred to as "foot centroid direction") is on the positive side or negative side of the X axis.

Then, at step S5200, posture estimation section 140 performs body orientation estimation process, which is a process to estimate the body orientation of person 340 based on the relative positional relationship between the head centroid position and the sole centroid position and predefined rules.

Specifically, posture estimation section 140 estimates that person 340 is assuming a posture in which its front side is oriented in the foot centroid direction that has been determined.

For example, posture estimation section 140 has established a rule that the direction from the head centroid position to the foot centroid position in the horizontal direction represents the body orientation of person 340 (if H<S then R, otherwise L). That is, when the X axis coordinate value (S) of the foot centroid position is greater than the X axis coordinate value (H) of the head centroid position (H<S), posture estimation section 140 decides that the front side of person 340 is oriented to the positive side of the X axis (i.e., body orientation is R). When the X-axis coordinate value (S) of the foot centroid position is smaller than the X axis coordinate value (H) of the head centroid position, posture estimation section 140 decides that the front side of person 340 is oriented to the negative side of the X axis (i.e., body orientation is L).

Figure 16:
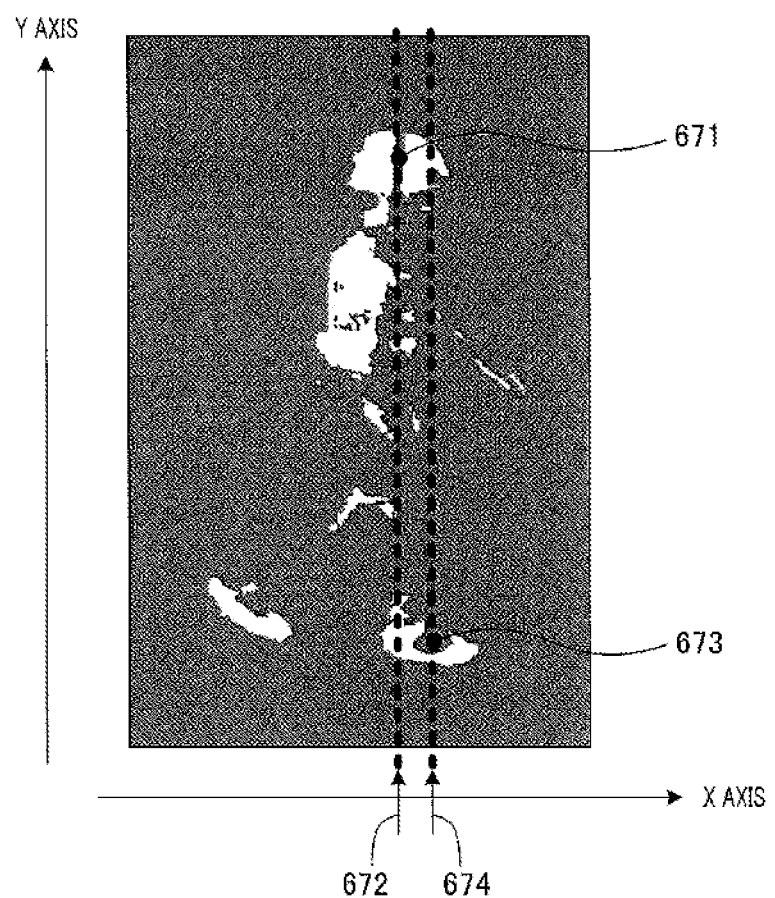
FIG. 16 illustrates exemplary head centroid position and foot centroid position in Embodiment 2 of the present invention.

FIG. 16 illustrates exemplary head centroid position and foot centroid position extracted from the background difference image of FIG. 7.

As shown in FIG. 16, X axis coordinate value 672(H) of head centroid position 671 is smaller than X axis coordinate value 674(S) of foot centroid position 673 (H<S). In such a case, posture estimation section 140 determines that the front side of person 340 is oriented to the positive side of the X axis (the right hand side in the drawing, or R).

If X axis coordinate value 672 (H) of head centroid position 671 agrees with X axis coordinate value 674 (S) of foot centroid position 673 (H=S), posture estimation section 140 may reuse the estimation result for the immediately preceding frame. This is because the posture of person 340 is unlikely to change significantly in a short period of time like the interval of one frame. Alternatively, posture estimation section 140 may determine that the front side of person 340 is oriented to the side of monitoring camera 320 or the opposite side, for example.

Posture estimation section 140 thereby can robustly estimate the body orientation of person 340 in a two-dimensional image irrespective of in which direction person 340 is moving.

At S6000 in FIG. 6, estimation result output section 150 performs estimation result output process, which is a process to output information indicating the body orientation estimated at S5000.

For example, estimation result output section 150 displays an arrow indicating the estimated body orientation over the input image per frame on a liquid crystal display.

At S7000 in FIG. 6, image input section 110 determines whether a predetermined condition for terminating processing is satisfied. The predefined condition may be that termination of the posture estimation process is instructed through a user operation, for example.

If the predetermined condition is not satisfied (S7000: NO), image input section 150 returns to step S1000 to repeat processing. If the predetermined condition is satisfied (S7000: YES), image input section 150 ends the entire process.

Through these actions, posture estimation apparatus 100 can estimate the head centroid position and foot centroid position of person 340 from video frames and estimate the posture of person 340 based on the relative positional relationship between the two positions.

The operation of posture estimation apparatus 100 has been thus far described.

As described, posture estimation apparatus 100 in the present embodiment estimates the head centroid position and the foot centroid position, which is the centroid position of a sole region positioned parallel with the floor, of a person from an input image. Based on the relative positional relationship between the estimated head centroid position and foot centroid position, posture estimation apparatus 100 estimates the posture (or body orientation) of the person. Posture estimation apparatus 100 thereby can estimate a person's posture with high accuracy.

The posture of a person does not change significantly in a short period of time as mentioned above; in particular the position of a sole region on which the body weight is placed hardly changes. Conversely, among sole candidate regions within a person candidate region, a sole region that has not changed over frames captured at different times is very likely to be the sole region on which the body weight is placed (i.e., the sole region which is in contact with and parallel with the floor).

Posture estimation apparatus 100 may accordingly estimate that a region of a sole candidate region that overlaps in multiple frames within a person candidate region (hereinafter referred to as "overlapping region") is a sole region.

Figure 17:
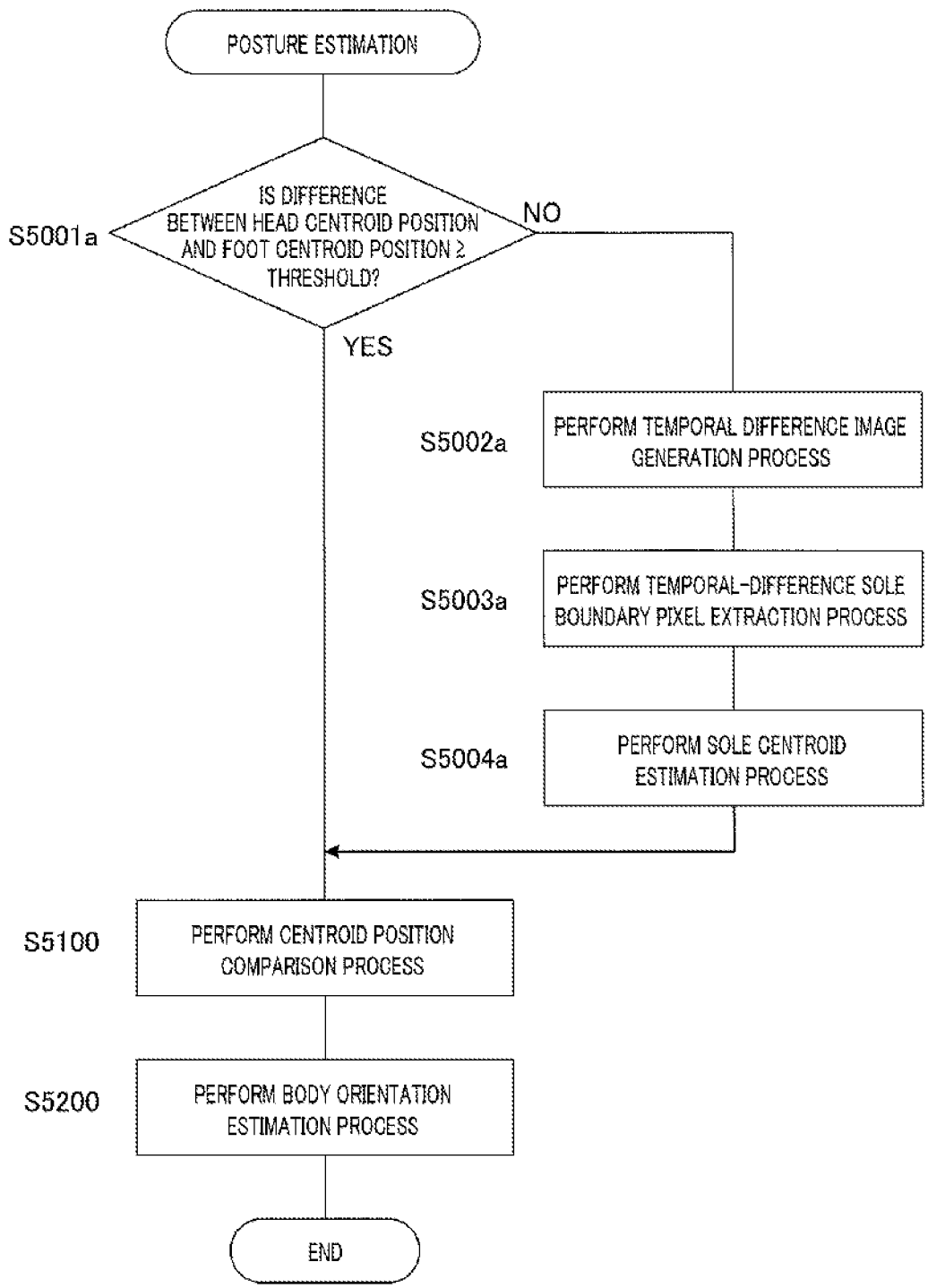
FIG. 17 is a flowchart illustrating another example of the posture estimation process in Embodiment 2 of the present invention.

FIG. 17 is a flowchart illustrating another example of the posture estimation process (step S5000 in FIG. 6). The flowchart of FIG. 17 includes processing at steps S5001a to S5004a as an addition to the flowchart of FIG. 15. In the flowchart, the same portions as in FIG. 15 are given the same step numbers and their descriptions are omitted.

At step S5001a, posture estimation section 140 first determines whether the difference (or absolute value) between the head centroid position and the foot centroid position in horizontal direction is equal to or greater than a predetermined threshold.

If the difference is equal to or greater than the threshold (S5001a: YES), posture estimation section 140 proceeds to stop S5100. If the difference is less than the threshold (S5001a: NO), posture estimation section 140 proceeds to step S5002a. Here, posture estimation section 140 informs sole centroid estimation section 132 that estimation of centroid position based on temporal-difference sole boundary pixels, which is described below, is necessary because the difference is less than the threshold.

At step S5002a, sole centroid estimation section 132 retrieves image data for the current frame and image data for the previous frame from sole region estimation section 131 and performs temporal difference image generation, which is a process to generate a temporal difference image that indicates agreement/non-agreement of values of pixels between the current frame and the previous frame.

The current frame is the latest frame captured at time t, and the previous frame is a past frame that was captured at time t-d that precedes time t by a predetermined period d. The predetermined period d may be an interval of f frames (where f is a natural number) for example, being a length of time predefined in relation to the walking speed of the person.

Figure 18:
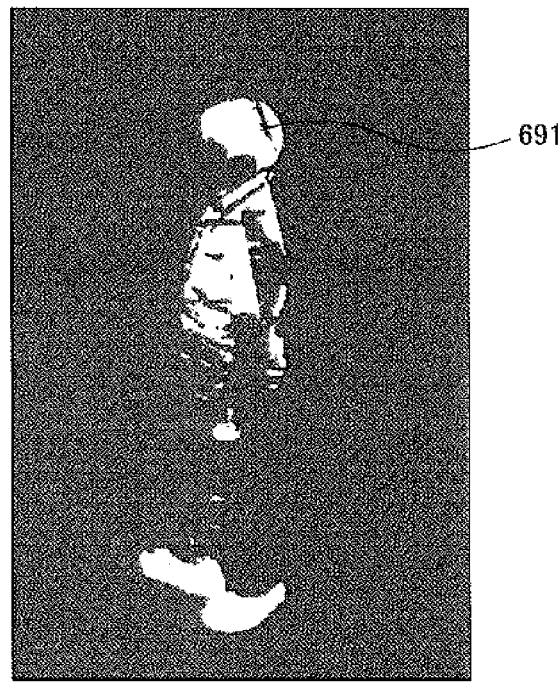
FIG. 18 is a first illustration for describing a temporal difference image in Embodiment 2 of the present invention.
Figure 19:
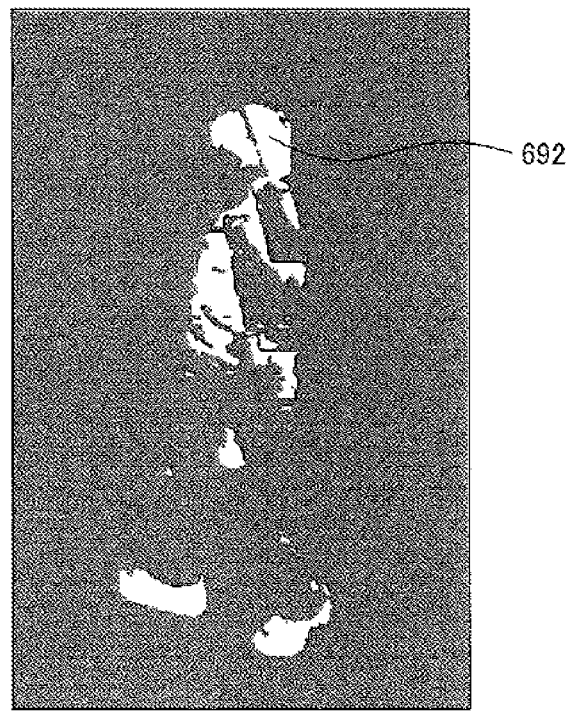
FIG. 19 is a second illustration for describing a temporal difference image in Embodiment 2 of the present invention.
Figure 20:
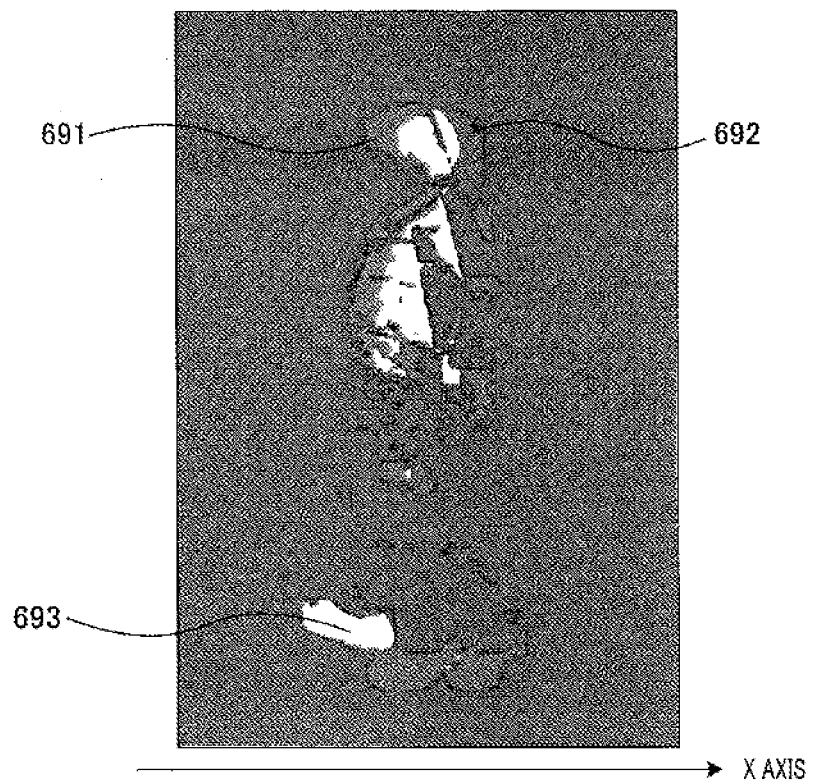
FIG. 20 is a third illustration for describing a temporal difference image in Embodiment 2 of the present invention.

FIGS. 18 to 20 are illustrations for describing the temporal difference image.

FIG. 18 shows an example of a background difference image generated from image data for the current frame. Specifically, FIG. 18 is an exemplary background difference image representing a person photographed when walking forward in the negative direction of the X axis while his/her left foot is moved from the rear to the front.

FIG. 19 is an example of a background difference image generated from image data for the previous frame.

FIG. 20 is an example of a temporal difference image generated from the background difference image of FIG. 18 and the background difference image of FIG. 19.

In person candidate region (the white region) 691 for the current frame shown in FIG. 18, two sole regions have similar sole angles and the difference in horizontal position between the head centroid position and the foot centroid position is small. In such a case, posture estimation is difficult only with the process described in FIG. 15.

Person candidate region (white region) 692 for the previous frame shown in FIG. 19 is different in position and shape from person candidate region 691 for the current frame due to the person's walking.

The current frame was captured when the left foot is moved from the rear to the front. In this situation, the center of mass of the body weight is located in the right foot and the position of the sole region of the right foot hardly changes. Consequently, the sole region of the right foot appears as overlapping region (the white region) 693 between the person candidate region 692 for the previous frame and person candidate region 691 for the current frame as shown in FIG. 20. Such overlapping region 693 is very likely to represent a sole region in which the center of the mass of the body weight is located and which is in contact with the floor.

At step S5003a in FIG. 17, sole centroid estimation section 132 performs temporal-difference sole boundary pixel extraction process, which is a process to extract temporal-difference sole boundary pixels from a generated temporal difference image and boundary position information generated by sole region estimation section 131. A temporal-difference sole boundary pixel is a sole boundary pixel that is included in a temporal difference image.

Specifically, sole centroid estimation section 132 extracts pixels that overlap in the sole boundary pixels and in the overlapping region as temporal-difference sole boundary pixels.

At step S5004a, sole centroid estimation section 132 estimates the foot centroid position using the overlapping region and position information for the temporal-difference sole boundary pixels.

Specifically, sole centroid estimation section 132 performs a similar process to the above-described sole centroid estimation on the overlapping region and the temporal-difference sole boundary pixels in place of the sole region and sole boundary, respectively.

As described, posture estimation apparatus 100 may perform posture estimation using a foot centroid position determined with video data (time-series data for an image). Thereby, even when estimation is difficult only with one frame, posture estimation apparatus 100 can robustly estimate the body orientation of person 340 irrespective of in which direction person 340 is moving.

Embodiment 3

Embodiment 3 of the present invention is an example that considers a case where a person is not walking in a normal posture.

The posture estimation described above in Embodiment 2 assumes that the person is walking in a normal posture, that is, with his/her back straight. In reality; however, a person is not always walking in such a posture; a person can take a posture like stooping over and picking up something from the floor, for example. In such a situation, the foot centroid position is often not located on the front side of the head centroid position. Consequently, an incorrect estimation result could be generated if posture estimation based on the relative positional relationship between the head centroid position and the foot centroid position is performed when the person is not walking in a normal posture.

The posture estimation apparatus in the present embodiment therefore estimates whether a person is walking in a normal posture based on the angle of his/her upper body. The posture estimation apparatus in the present embodiment is configured to perform posture estimation based on positional relationship as described above if the person is estimated not to be walking in a normal posture.

Figure 21:
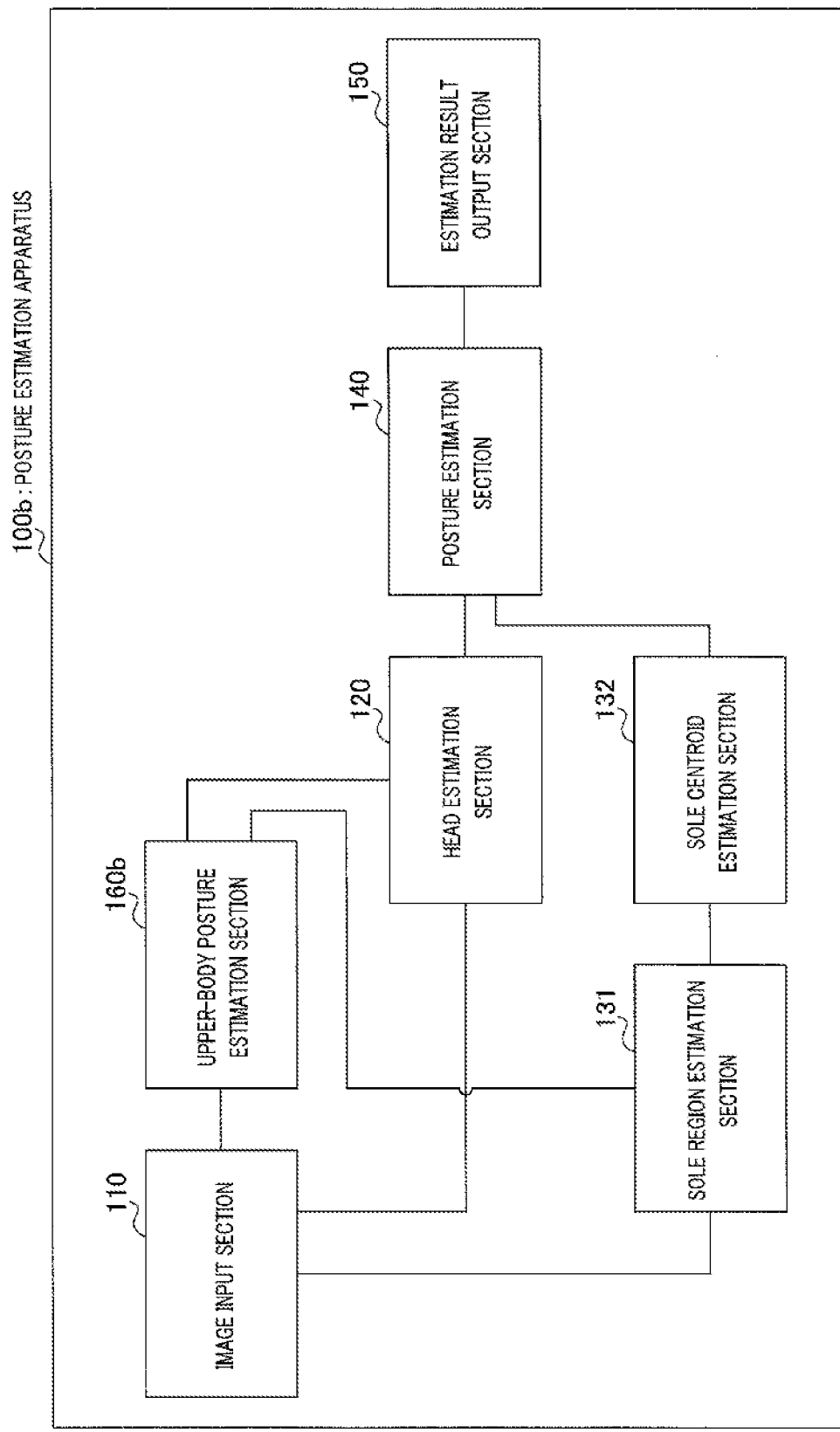
FIG. 21 is a block diagram showing an exemplary configuration of the posture estimation apparatus according to Embodiment 3 of the present invention.

FIG. 21 is a block diagram showing an exemplary configuration of the posture estimation apparatus in the present embodiment, corresponding to FIG. 5 describing Embodiment 2. The same portions as FIG. 5 are denoted with the same reference numerals and descriptions about them are omitted.

In FIG. 21, posture estimation apparatus 100b includes upper-body posture estimation section 160b in addition to the configuration in FIG. 5.

Upper-body posture estimation section 160b estimates the angle of the person's upper body from image information.

Specifically, upper-body posture estimation section 160b retrieves image data for a captured image from image input section 110, and estimates the position of the person's head 418 and the position of trunk 411 (see FIG. 3) from the image data. Upper-body posture estimation section 160b then estimates the angle of the upper body of the person included in the image from the relative positional relationship between the head position and the trunk position.

The head position refers to the estimated position of head 418, which may be a head centroid position estimated as done by head estimation section 120, for example. The trunk position refers to the estimated position of trunk 411. Upper body angle is information indicating the orientation of the person's upper body; it may be the angle of inclination of the upper body relative to the vertical direction in real space, for example.

Upper-body posture estimation section 160b then determines whether the estimated upper body angle falls within a predetermined range. The predetermined range is the possible range of the upper body angle when a person is walking in a normal posture. Upper-body posture estimation section 160b outputs information indicating whether the upper body angle is within the predetermined range to sole region estimation section 131 and head estimation section 120.

In the present embodiment, head estimation section 120 and sole region estimation section 131 perform the processing described in Embodiment 2 only when the estimated upper body angle is within the predetermined range. That is, in the present embodiment, estimation result output section 150 outputs a posture estimation result if the estimated upper body angle is within the predetermined range.

In the present embodiment, estimation result output section 150 may output an error message if posture estimation could not be performed as a result of head estimation section 120 and sole region estimation section 131 not conducting processing.

Figure 22:
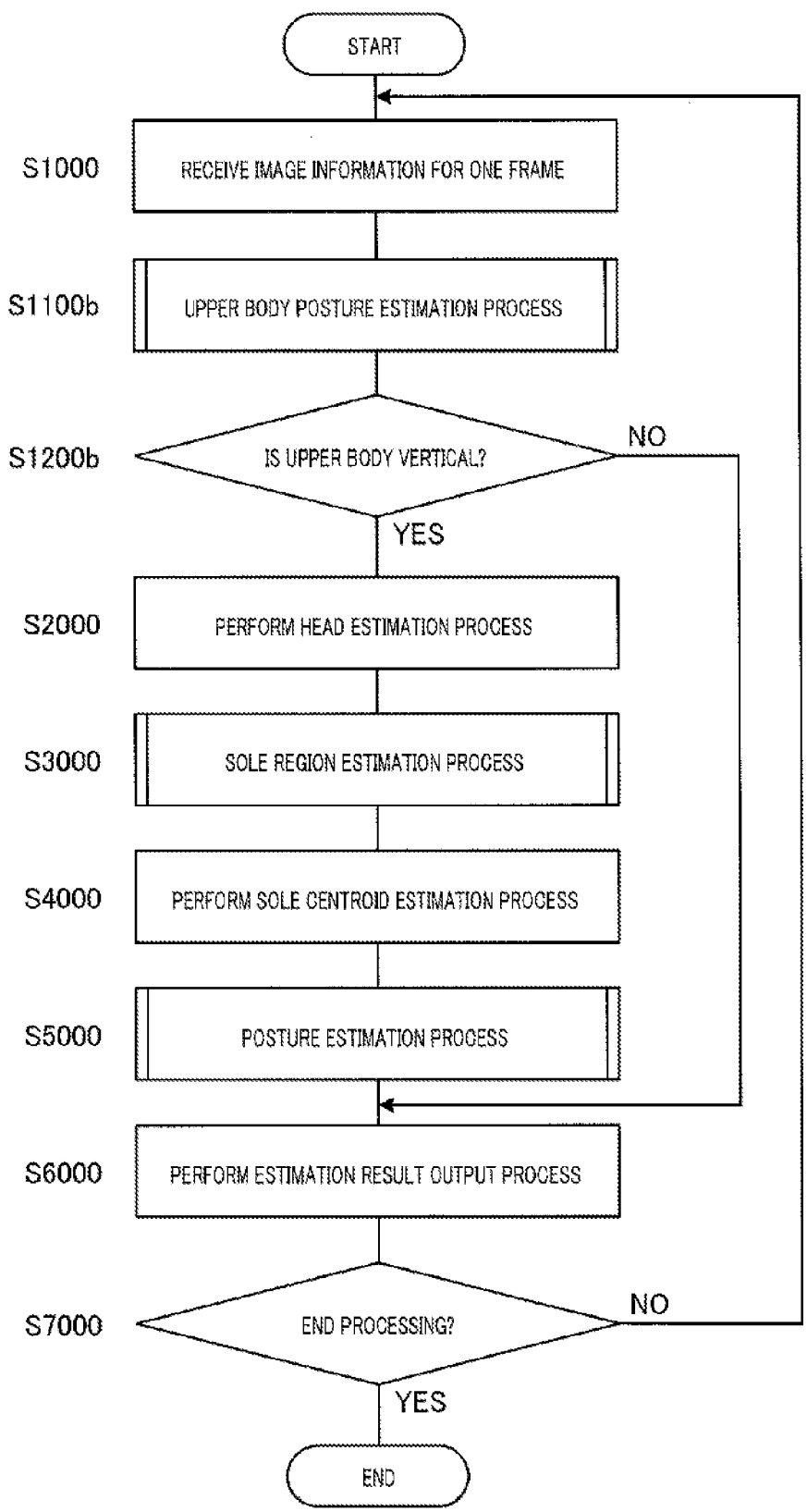
FIG. 22 is a flowchart illustrating an exemplary operation of the posture estimation apparatus according to Embodiment 3 of the present invention.

FIG. 22 is a flowchart illustrating an exemplary operation of the posture estimation apparatus. The flowchart shown in FIG. 22 includes steps S1100b and S1200b as an addition to the flowchart of FIG. 6. In the flowchart, the same portions as in FIG. 6 are denoted with the same step numbers and their descriptions are omitted.

At step S1100b, upper-body posture estimation section 160b performs upper-body posture estimation process, which is a process to estimate the angle of the upper body of person 340 included in an image.

Figure 23:
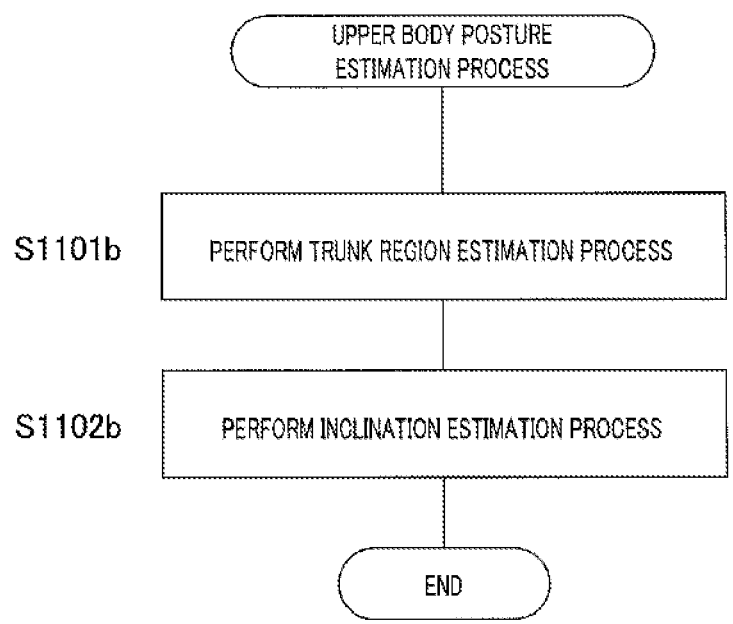
FIG. 23 is a flowchart illustrating an example of an upper-body posture estimation process in Embodiment 3 of the present invention.

FIG. 23 is a flowchart illustrating an example of the upper-body posture estimation process (S1100b in FIG. 22).

At step S1101b, upper-body posture estimation section 160b performs trunk region estimation process, which is a process to estimate the trunk region of person 340 included in an image.

Specifically, upper-body posture estimation section 160b determines the trunk region in a similar manner to the estimation of the head region described in Embodiment 2, for example. In this process, upper-body posture estimation section 160b may approximate the trunk region as an ellipse using Hough transform. Hough transform is a well-known technique capable of determining five parameters representing the center (X and Y coordinates), major axis, minor axis, and slope of an ellipse from edge information. Upper-body posture estimation section 160b calculates the center position of the ellipse thus determined as the centroid position of the trunk (hereinafter referred to as "trunk centroid position").

At step S1102b, upper-body posture estimation section 160b performs inclination estimation process and returns to the process of FIG. 22. The inclination estimation process is a process to estimate the inclination of the person's upper body from the relative positional relationship between the head centroid position and the trunk centroid position.

Specifically, upper-body posture estimation section 160b estimates the angle formed by the straight line passing through the head centroid position and the trunk centroid position with the vertical direction (the direction orthogonal to the horizontal direction) of the real space as the upper body angle.

Upper-body posture estimation section 160b may also estimate the upper body angle from other information such as the length direction of the trunk region (e.g., the major axis direction of the ellipse).

At step S1200b in FIG. 22, upper-body posture estimation section 160b determines whether the person's upper body is vertical from the estimated upper body angle.

Specifically, upper-body posture estimation section 160b decides whether the upper body is vertical by determining whether the upper body angle is within the aforementioned predetermined range.

If the upper body is vertical (S1200b: YES), upper-body posture estimation section 160b proceeds to step S2000. If the upper body is not vertical (S1200b: NO), upper-body posture estimation section 160b proceeds to step S6000. That is, posture estimation apparatus 100b does not perform posture estimation when the upper body is not vertical.

In this manner, the posture estimation apparatus 100b in the present embodiment estimates the upper body angle. Posture estimation apparatus 100b outputs the result of posture estimation based on the relative positional relationship between the head centroid position and foot centroid position if the upper body angle falls within a predetermined range.

Posture estimation apparatus 100*b* thereby can avoid output of a posture estimation result for an image that does not satisfy the precondition for posture estimation, which can improve the precision of output posture estimation results.

While Embodiments 2 and 3 of the present invention described above illustrated estimation of sole regions from a background difference image, this is not a restriction. For example, the posture estimation apparatus may use an image from which noise has been removed from the background difference image using a median filter, a well-known technique. Alternatively, posture estimation apparatus 100 may use an image generated by superimposition of a background difference image and an edge image.

The posture estimation apparatus may also estimate a sole region by use of a sole likelihood map describing the probability that parallel lines at an interval corresponding to the size of the person's foot are present per pixel. This can remove noise or supplement missing information, so that posture estimation apparatus 100 can estimate sole regions more precisely.

In relation to the sole angle extraction process performed at step S3400 in FIG. 8, the posture estimation apparatus may estimate the sole angle using a scheme other than rectangle rotation. For instance, posture estimation apparatus may calculate an approximate straight line by applying the method of least squares, a well-known technique, to sole boundary pixels and estimate the sole angle from the angle formed by the approximate straight line and the horizontal direction.

Alternatively, the posture estimation apparatus may divide a sole region into subregions and estimate the sole angle for each of the subregions. In this case, the posture estimation apparatus may use the method of least squares, which is a well-known technique, to determine a polynomial approximation curve for sole boundary pixels and output coefficients. By thus dividing a sole region into subregions and finely estimating sole angles, the posture estimation apparatus can use only information for sole boundary pixels positioned in a portion whose boundary direction is closer to the horizontal direction during the sole centroid estimation process at step S3000 in FIG. 6. This enables the posture estimation apparatus to estimate the foot centroid position with improved accuracy.

In relation to the sole centroid estimation process at step S3000 in FIG. 6, the posture estimation apparatus may output the pixel having the smallest Y coordinate value among the sole boundary pixels of the sole region whose boundary direction is closer to the horizontal direction as the foot centroid position. This enables the posture estimation apparatus to accurately determine the foot centroid position corresponding to a sole region that is parallel with the floor when the person is wearing shoes with a small flat portion in the shoe soles, such as high-heel shoes.

When a sole region is represented by multiple subregions and their respective sole angles, the posture estimation apparatus may determine the centroid of sole boundary pixels in a subregion whose boundary direction is closest to zero degree, that is, closest to horizontal, as the foot centroid position. Posture estimation apparatus 100 thereby can accurately determine the foot centroid position corresponding to a sole region that is parallel with the floor when person 340 is wearing shoes with soft soles.

When sole boundary pixels are approximated by a polynomial approximation curve, the posture estimation apparatus may assigning a weighting to the sole boundary pixels according to information on the slope of the curve and then estimate the foot centroid position.

More specifically, the sole centroid estimation section of the posture estimation apparatus may assign a weighting to estimated sole regions so that a larger weighting is assigned to a portion of a sole region corresponding to a sole boundary extending in a direction approximating to the horizontal direction. The posture estimation apparatus may then set the centroid position of the resulting weights as the foot centroid position.

More specifically, the posture estimation apparatus assigns a weighting to sole boundary pixels such that a sole boundary pixel affects the foot centroid position more as the slope of the polynomial approximation curve of the sole region is closer to zero (horizontal). Conversely, the posture estimation apparatus assigns a weighting to sole boundary pixels such that a sole boundary pixel affects the foot centroid position less for a larger slope of the polynomial approximation curve of the sole region. After assigning the weighting, the posture estimation apparatus determines the foot centroid position.

The posture estimation apparatus calculates foot centroid position C using equation (2) below, for example. Here, g(m) represents a weighting determined for the mth sole boundary pixel, where g(m) satisfies equation (3);

[2]

$$C = \left( \frac{\sum_{m=1}^{k} g(m) * AGK(m)}{k}, \frac{\sum_{m=1}^{k} g(m) * AG(m)}{k} \right) \quad \text{(Equation 2)}$$

[3]

$$\sum_{m=1}^{k} g(m) = 1 \quad \text{(Equation 3)}$$

Thus, the posture estimation apparatus can make the angle of a sole boundary pixel positioned at a point of change in sole angle reflected more appropriately in the foot centroid position, improving the accuracy of foot centroid position estimation.

The posture estimation apparatus may also perform posture estimation with video or an image captured by a depth map camera or stereo camera, for example, instead of images captured by a monocular camera.

The posture estimation apparatus may also estimate a sole region from other kinds of image information, such as an edge image or a likelihood map showing distribution of the certainty that body parts are present.

The posture estimation apparatus may also estimate a sole region having a horizontal sole based on information other than the boundary direction. For example, if a contact sensor is installed on the floor, the posture estimation apparatus may estimate that one of sole regions that coincides with an area in which a contact has been detected by the contact sensor is a sole region which is in contact with the floor and whose sole is parallel with the floor. That is to say, the foot estimation section may assume that the position of a foot in contact with the floor represents the position of the foot including a sole being parallel with the floor.

The posture estimation apparatus may employ positions other than the centroid positions described in Embodiments 2 and 3 as the position of the person's head and the position of a foot including a sole being parallel with the floor. For example, the posture estimation apparatus may define the head position as the position of the pixel having the largest Y-axis coordinate value within a person candidate region and the position of a foot whose sole is parallel with the floor as the position of the pixel having the smallest Y-axis coordinate value.

The posture estimation apparatus may estimate the orientation of the body trunk of other kinds of humanoid articulated object, such as a humanoid robot or bipedal animals, instead of a human being.

Aside from humanoid articulated objects, the present invention is also applicable to various kinds of articulated object (including ones with three or more legs) for which correlation is observed between the head position and the position of a foot including a sole being parallel with the floor.

Embodiment 4

Embodiment 4 of the present invention is an example of basic aspects of the present invention.

Figure 24:
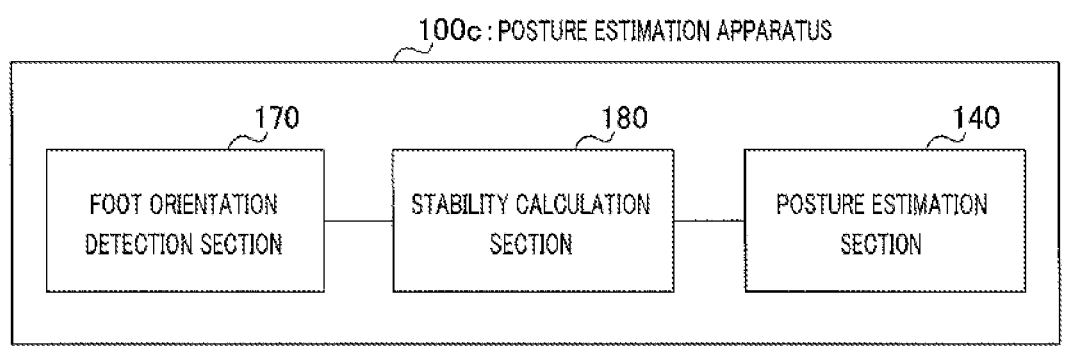
FIG. 24 is a block diagram showing an exemplary configuration of the posture estimation apparatus according to Embodiment 4 of the present invention.

FIG. 24 is a block diagram showing an exemplary configuration of the posture estimation apparatus in the present embodiment.

In FIG. 24, posture estimation apparatus 100c is an apparatus for estimating the posture of a humanoid articulated object including human body, and includes foot orientation detection section 170, stability calculation section 180, and posture estimation section 140.

Foot orientation detection section 170 detects the orientations of the left and right feet of a humanoid articulated object using one of the configurations described in Embodiments 1 through 3.

Stability calculation section 180 calculates left foot stability, which is the degree of stability of the orientation of the left foot, and right foot stability, which is the degree of stability of the orientation of the right foot.

Posture estimation section 140 estimates the orientation of the body trunk of the humanoid articulated object as its posture from the left foot stability, left foot orientation, right foot stability, and right foot orientation.

Posture estimation apparatus 100c having such features estimates the body orientation of a humanoid articulated object as its posture from left foot orientation and right foot orientation. While the orientation of the top of a foot (i.e., the topside or upper side of the foot) in contact with the floor stably and accurately corresponds to the trunk orientation, the orientation of the top of the foot not in contact with the floor is not stable and varies with respect to the trunk orientation to some extent. To address this, posture estimation apparatus 100c estimates body orientation based on not only left and right foot orientations but the stability of the orientation of their tops. Posture estimation apparatus 100c thereby can accurately estimate the posture of a humanoid articulated object.

Embodiment 5

Embodiment 5 represents an example of specific aspects of the present invention as applied to a posture estimation apparatus that estimates the orientation of a person's body trunk from video of the person.

As the posture estimation system according to the present embodiment is the same as the one described with FIG. 2, the detailed descriptions are omitted. In this embodiment, posture estimation apparatus 100c replaces posture estimation apparatus 100 described in FIG. 2.

As the description given above with FIG. 3 also applies to the posture of person 340, for which estimation is performed in the present embodiment, its detailed descriptions are omitted.

FIG. 4 is a diagram for illustrating the principle of body orientation estimation in the present embodiment.

As shown in FIG. 4, body orientation 421 is the side to which the tops of the left foot and right foot (hereinafter collectively referred to as "tops of the feet" where appropriate) are oriented in the direction orthogonal to line segment 422 connecting the left and right shoulders of person 340 (hereinafter referred to as "shoulder line") in a three-dimensional space.

Here, consider average feet orientation 425, which is an orientation determined by averaging the orientation of the top of the left foot (hereinafter referred to as "left foot orientation 423") and the orientation of the top of the right foot (hereinafter referred to as "right foot orientation 424"). When person 340 takes a natural posture with his/her feet in contact with the floor, average feet orientation 425 approximately equals to body orientation 421 due to body constraints. Hence, for posture estimation, the orientations of the tops of the left and right feet may be extracted and averaged.

When one of person 340's feet is not in contact with the floor such as while he/she is walking, the orientation of that foot's top has high freedom, resulting in low accuracy of agreement between average feet orientation 425 and body orientation 421.

In contrast, the other foot which is in contact with the floor serves as the supporting leg for keeping balance, so the orientation of its top is stable and has high correlation with body orientation 421. When the person changes its body orientation, he/she repeats the motion of switching the supporting leg, so that either one of the legs is always serving as the supporting leg.

Posture estimation apparatus 100c thus calculates the stability of orientations of the tops of the left and right feet, and estimates the body orientation in consideration of the stability. Specifically, posture estimation apparatus 100c assigns weightings based on the stability of orientation of the top of the left foot (hereinafter referred to as "left foot stability") and the stability of orientation of the top of the right foot (hereinafter referred to as "right foot stability") and combines left foot orientation 423 and right foot orientation 424. Posture estimation apparatus 100c then sets the orientation resulting from the combination with the assigned weightings as the body orientation of person 340.

Posture estimation apparatus 100c thereby can estimate body orientation with the orientation of the top of the supporting foot, which has high correlation with body orientation, always assigned a large weighting.

In the present embodiment, it is assumed that stability becomes a greater value as variation in foot orientation (the orientation of the top of a foot) continues to be small for a longer period of time. In other words, stability serves as a measure indicating the length of time over which the top of the foot is continuously in the same orientation in the present embodiment.

A humanoid articulated object including a human body has a characteristic of orientations of the tops of the feet being easy to vary during a motion that is not related to change in its body orientation. A motion not related to change in body orientation is dangling one's legs, for example. Conversely, when the tops of the feet remain in the same orientation for a long time, the orientation of the tops of the feet therefore can be considered to have high correlation with body orientation of the object. Accordingly, stability can be regarded as a measure indicating the degree of correlation between tops-of-feet orientation and body orientation. Details of how to determine stability will be discussed below.

In the present embodiment, posture estimation apparatus 100c determines the orientation of the top of the left foot, orientation of the top of the right foot, and body orientation as orientations in a two-dimensional image plane, rather than orientations in a three-dimensional real space.

Figure 25:
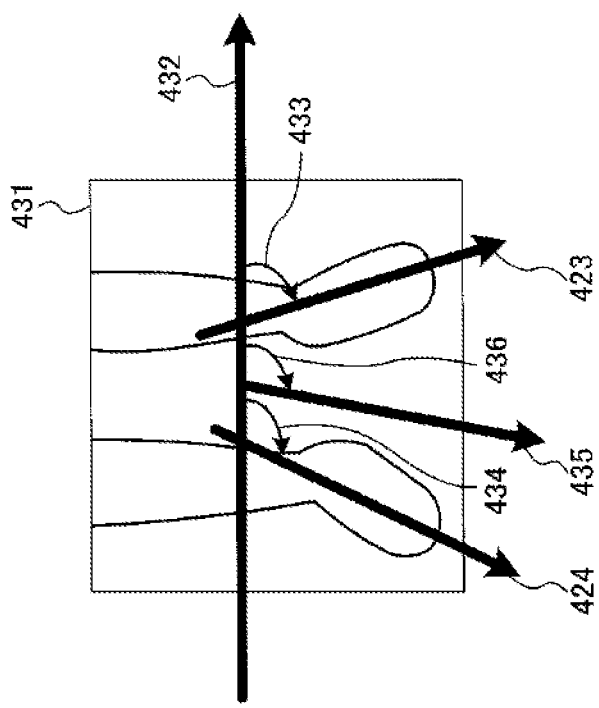
FIG. 25 is a diagram for describing the definition of orientation in Embodiment 5 of the present invention.

FIG. 25 is a diagram for describing the definition of orientation in the present embodiment.

As illustrated in FIG. 25, posture estimation apparatus 100c predefines a reference orientation (e.g., horizontally rightward orientation) 432 on image plane 431. Posture estimation apparatus 100c then defines left foot orientation 423 with clockwise angle 433 formed by left foot orientation 423 with reference orientation 432, and right foot orientation 424 with clockwise angle 434 formed by right foot orientation 424 with reference orientation 432. Posture estimation apparatus 100c also defines body orientation 435 with clockwise angle 436 formed with reference orientation 432.

Body orientation 435 thus defined may be converted to an orientation in three-dimensional real space with the installation parameters of monitoring camera 320 and information on standard body length.

Posture estimation system 200 has been generally described thus far.

Figure 26:
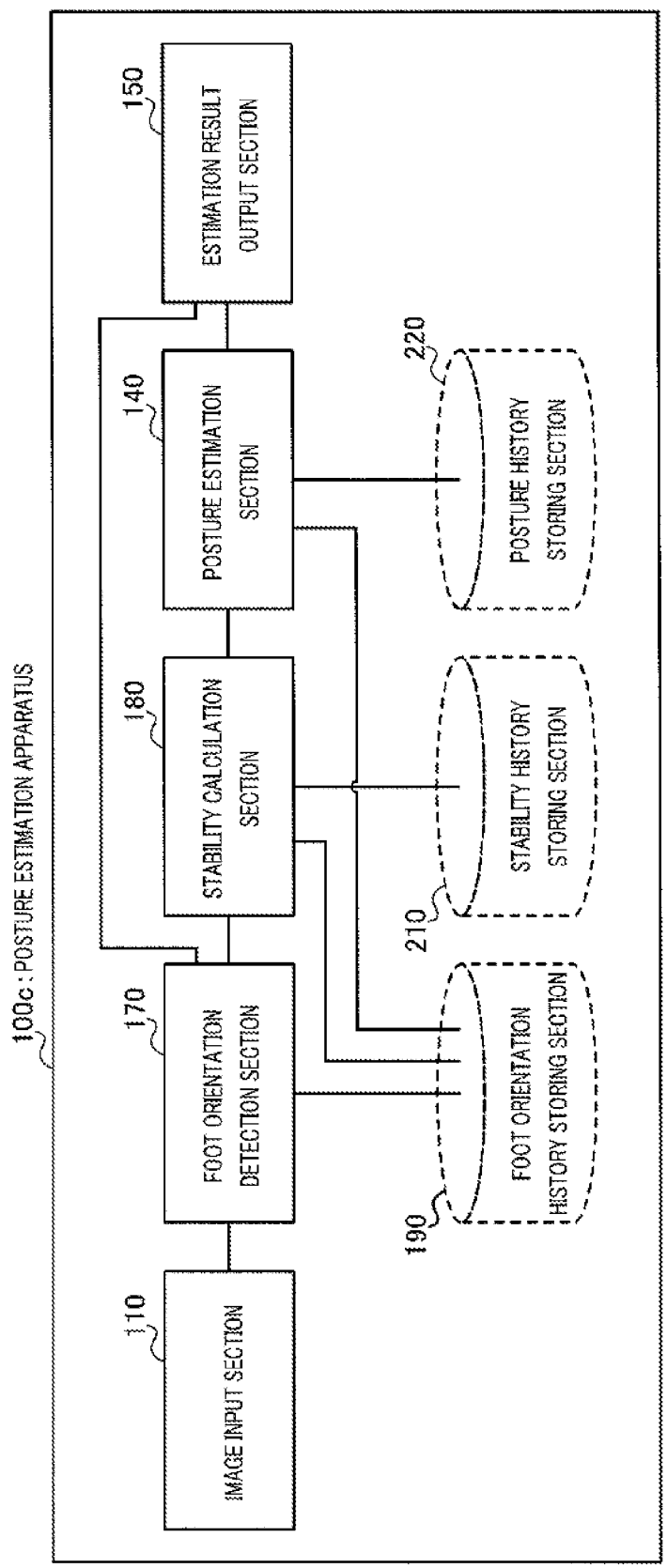
FIG. 26 is a block diagram showing an exemplary configuration of posture estimation apparatus according to Embodiment 5 of the present invention.

The configuration of posture estimation apparatus 100c is described next. FIG. 26 is a block diagram showing an exemplary configuration of posture estimation apparatus 100c.

In FIG. 26, posture estimation apparatus 100c includes image input section 110, foot orientation detection section 170, foot orientation history storing section 190, stability calculation section 180, stability history storing section 210, posture estimation section 140, posture history storing section 220, and estimation result output section 150.

Image input section 110 receives video data for video captured by monitoring camera 320 and outputs image data for still images (hereinafter referred to as "frames") which are units making up the video to foot orientation detection section 170 sequentially.

Foot orientation detection section 170 detects the orientations of the left and right feet of a person included in an image from the input image data (or video, hereinafter referred to as "image data" where appropriate). Foot orientation detection section 170 then outputs the detected left and right foot orientations to stability calculation section 180 and foot orientation history storing section 190.

Foot orientation detection section 170 may use any of configurations of Embodiment 1 shown in FIG. 1, Embodiment 2 in FIG. 5, or Embodiment 3 in FIG. 21 to determine the left and right foot orientations.

Specifically, the heel-to-toe orientation of each foot is calculated from the sole angle of each sole region estimated by foot estimation section 130 (FIG. 1) or sole region estimation section 131 (FIG. 5 or 21) and information on the orientation of the person's front side estimated by posture estimation section 140 (FIG. 1, 5, or 21).

Figure 27:
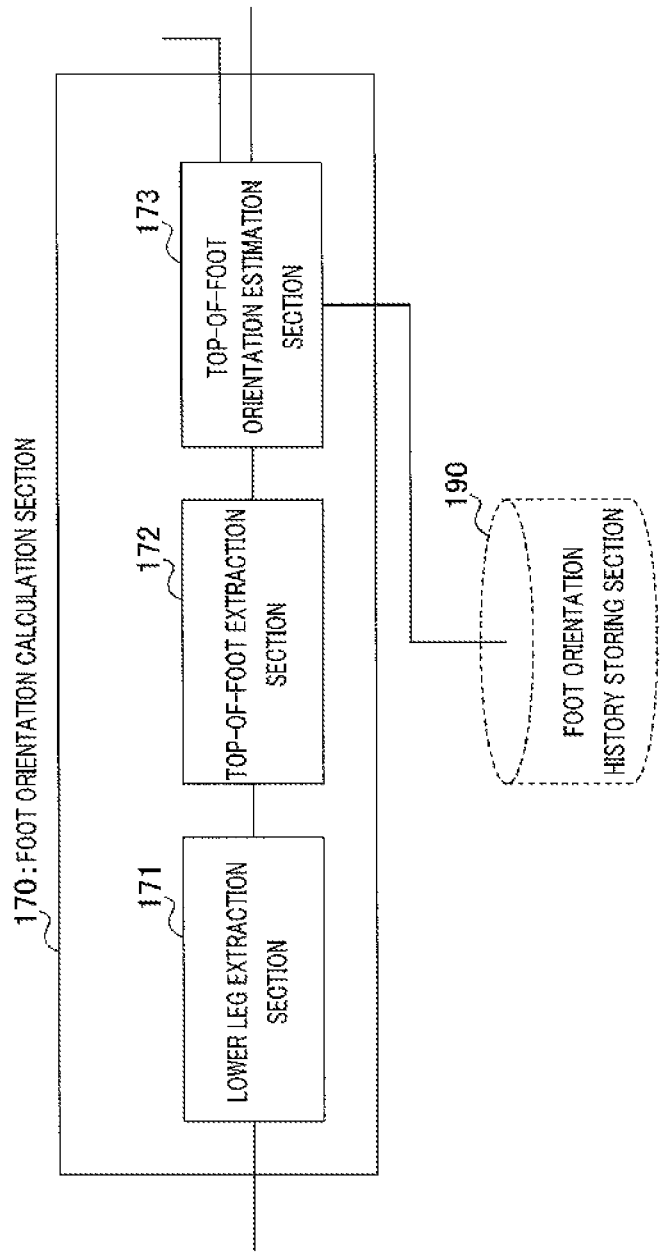
FIG. 27 is a block diagram showing an example of the configuration of a foot orientation detection section according to Embodiment 5 of the present invention.

FIG. 27 is a block diagram showing another example of the configuration of foot orientation detection section 170.

In FIG. 27, foot orientation detection section 170 includes lower leg extraction section 171, top-of-foot extraction section 172, and top-of-foot orientation estimation section 173.

Lower leg extraction section 171 extracts a rectangular region in which the person's left lower leg is estimated to be positioned as a left lower leg rectangle from image data input from image input section 110. Lower leg extraction section 171 also extracts a rectangular region in which the person's right lower leg is estimated to be positioned as a right lower leg rectangle from the image data. Lower leg extraction section 171 then outputs the extracted left and right lower leg rectangles (hereinafter referred to as "lower leg rectangles" where appropriate) and image data to top-of-foot extraction section 172.

Top-of-foot extraction section 172 extracts a rectangular region in which the top of the left foot is estimated to be positioned as a left top-of-foot rectangle from the image data and the left lower leg rectangle input to it. Top-of-foot extraction section 172 also extracts a rectangular region in which the top of the right foot is estimated to be positioned as a right top-of-foot rectangle from the image data and right lower leg rectangle. Top-of-foot extraction section 172 then outputs the extracted the left and right top-of-foot rectangle (hereinafter collectively referred to as "top-of-foot rectangles" where appropriate) and image data to top-of-foot orientation estimation section 173.

Top-of-foot orientation estimation section 173 estimates the left foot orientation from the image data and top of the left foot rectangle input to it. Top-of-foot orientation estimation section 173 also estimates the right foot orientation from the image data and right top-of-foot rectangle. Top-of-foot orientation estimation section 173 then outputs the estimated left foot orientation and right foot orientation (hereinafter collectively referred to as "feet orientation" where appropriate) to foot orientation history storing section 190 and stability calculation section 180. Top-of-foot orientation estimation section 173 also outputs the image data to estimation result output section 150.

It is possible that top-of-foot orientation estimation section 173 cannot estimate the left foot orientation only from image data and a top of the left foot rectangle, such as when there is noise in image data. In such a case, top-of-foot orientation estimation section 173 retrieves the left foot orientation stored in foot orientation history storing section 190 that was estimated for the previous frame as the left foot orientation for the current frame, for example.

Similarly, there is a case where top-of-foot orientation estimation section 173 cannot estimate the right foot orientation only from image data and a right top-of-foot rectangle. In such a case, top-of-foot orientation estimation section 173 retrieves the right foot orientation stored in foot orientation history storing section 190 that was estimated for the previous frame as the right foot orientation for the current frame.

Foot orientation history storing section 190 in FIG. 26 stores the left foot orientation and right foot orientation input at the current frame (hereinafter referred to just as "the current orientations") and the left foot orientation and right foot orientation that were input at the previous frame (hereinafter referred to just as "the previous orientations").

Stability calculation section 180 calculates left foot stability from the current left foot orientation input to it and the previous left foot orientation stored in foot orientation history storing section 190. Stability calculation section 180 also calculates right foot stability from the current right foot orientation input to it and the previous right foot orientation stored in foot orientation history storing section 190. Stability calculation section 180 then outputs the calculated left foot stability and right foot stability to stability history storing section 210 and posture estimation section 140.

Figure 28:
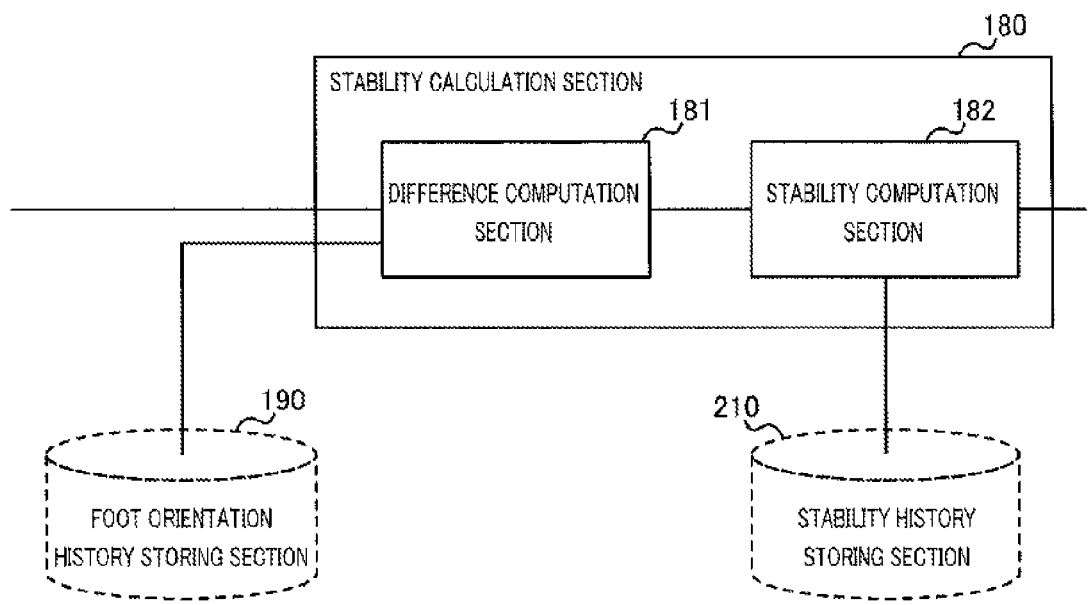
FIG. 28 is a block diagram showing an exemplary configuration of a stability calculation section according to Embodiment 5 of the present invention.

FIG. 28 is a block diagram showing an exemplary configuration of the stability calculation section.

In FIG. 28, stability calculation section 180 includes difference computation section 181 and stability computation section 182.

Difference computation section 181 calculates the difference between the current left foot orientation input from foot orientation detection section 170 and the previous left foot orientation from foot orientation history storing section 190 as a left foot difference. Difference computation section 181 also calculates the difference between the current right foot orientation input from foot orientation detection section 170 and the previous right foot orientation from foot orientation history storing section 190 as a right foot difference. Difference computation section 181 then outputs the left foot difference and right foot difference (hereinafter collectively referred to as "difference" where appropriate) it calculated to stability computation section 182.

Stability computation section 182 compares the input left foot difference with a predetermined threshold, and calculates stability so that the left foot stability assumes a greater value as variation in left foot orientation continues to be small for a longer period of time. In this calculation, stability computation section 182 uses the input left foot difference, and if the left foot stability that was calculated for the previous frame (hereinafter referred to just as "the previous foot stability") is stored in stability history storing section 210, uses the previous left foot stability. Stability computation section 182 also compares the input right foot difference with a predetermined threshold, and calculates the right foot stability so that the right foot stability assumes a greater value as variation in right foot orientation continues to be small for a longer period of time. In this calculation, stability computation section 182 uses the input right foot difference, and if the right foot stability that was calculated for the previous frame is stored in stability history storing section 210, uses the previous right foot stability. Stability computation section 182 then outputs the calculated left foot stability and right foot stability to stability history storing section 210 and posture estimation section 140.

Stability history storing section 210 in FIG. 26 stores the previous left foot stability and right foot stability input from stability computation section 182.

Posture estimation section 140 estimates the body orientation of the person included in the captured video (here person 340) from the left foot stability and right foot stability input to it, and the current left foot orientation and right foot orientation stored in foot orientation history storing section 190. Posture estimation section 140 then outputs the result of estimation to posture history storing section 220 and estimation result output section 150.

More specifically, posture estimation section 140 estimates the body orientation by applying a weighting based on the left foot stability and right foot stability and combining the left and right foot orientations.

Figure 29:
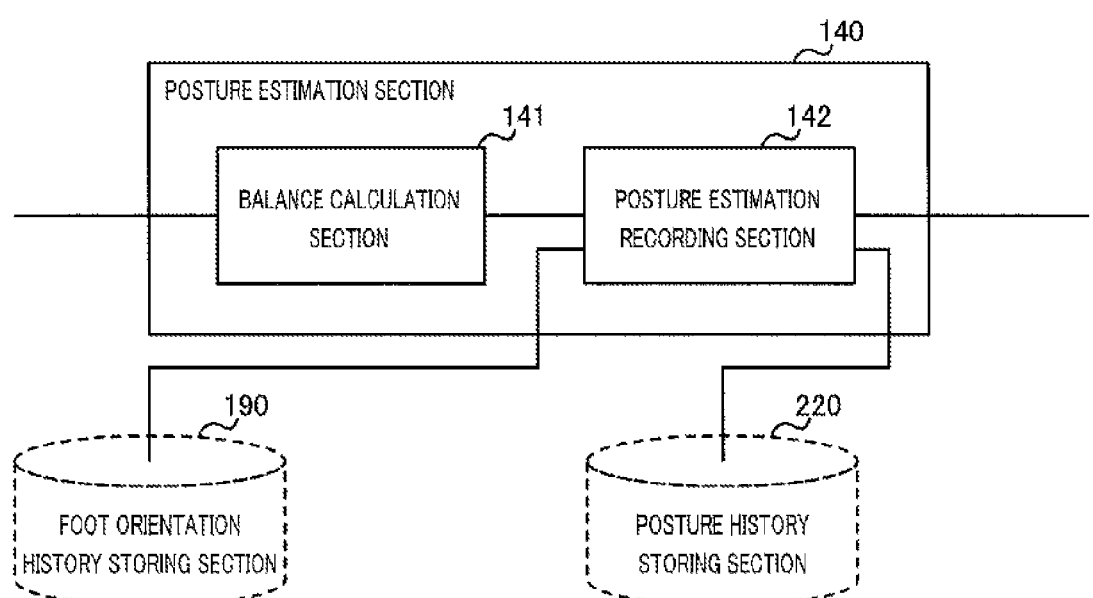
FIG. 29 is a block diagram showing an exemplary configuration of a posture estimation section according to Embodiment 5 of the present invention.

FIG. 29 is a block diagram showing an exemplary configuration of posture estimation section 140.

In FIG. 29, posture estimation section 140 includes balance calculation section 141 and posture estimation recording section 142.

Balance calculation section 141 calculates a left balance level and a right balance level from the left foot stability and right foot stability input from stability calculation section 180. More specifically, balance calculation section 141 calculates left balance level and right balance level so that the left balance level assumes a relatively greater value for a higher left foot stability and that the right balance level assumes a relatively greater value for a higher right foot stability. The left balance level is a weighting for the left foot orientation that is used by posture estimation recording section 142 at a later stage to combine the left and right foot orientations. The right balance level is a weighting for the right foot orientation that is used by posture estimation recording section 142 at a later stage to combine the left and right foot orientations. Balance calculation section 141 then outputs the left balance level and right balance level to posture estimation recording section 142.

Posture estimation recording section 142 assigns weightings according to the left and right balance levels input to it, and combines the current left foot orientation stored in fool orientation history storing section 190 and the current right foot orientation stored in toot orientation history storing section 190. Posture estimation recording section 142 then outputs the resulting orientation to posture history storing section 220 and estimation result output section 150 as body orientation.

If the result of estimation for the previous frame (hereinafter referred to just as "the previous result") is stored in posture history storing section 220, posture estimation recording section 142 additionally uses the previous estimation result to estimate body orientation. That is, posture estimation recording section 142 combines the left foot orientation and right foot orientation, which have been assigned weightings, and the previous body orientation to calculate an estimated value of the body orientation.

Posture history storing section 220 in FIG. 26 stores the previous estimation result (i.e., an estimated body orientation) input from posture estimation recording section 142.

Estimation result output section 150 outputs the estimation result input to it. For example, estimation result output section 150 displays an image generated by superimposing an arrow indicating the body orientation input from posture estimation section 140 on image data input from foot orientation detection section 170 on a liquid crystal display (not shown).

Posture estimation apparatus 100c having such features can estimate a person's body orientation from left foot orientation and right foot orientation in consideration of their stability. It means that posture estimation apparatus 100c can perform posture estimation with reduced influence of variations in orientation of the tops of the feet caused by movement of the feet. Posture estimation apparatus 100c thereby can estimate the posture of a humanoid articulated object with high accuracy.

The configuration of posture estimation apparatus 100c has been described thus far.

Figure 30:
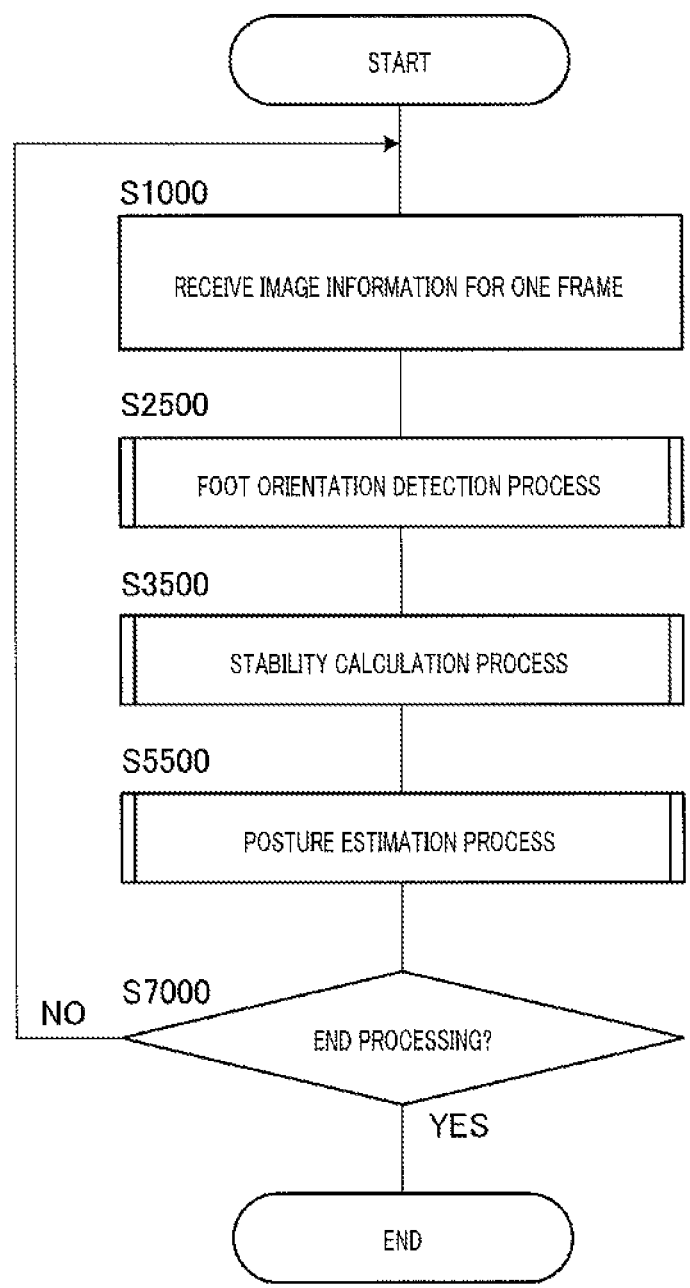
FIG. 30 is a flowchart illustrating an exemplary operation of the posture estimation apparatus according to Embodiment 5 of the present invention.

The operation of posture estimation apparatus 100c will now be described. FIG. 30 is a flowchart illustrating an exemplary operation of the posture estimation apparatus.

At step S1000, image input section 110 receives image information (or captured video, or image data) corresponding to one frame.

At step S2500, foot orientation detection section 170 performs foot orientation detection process for detecting the left foot orientation and right foot orientation. In the foot orientation detection process, prepared lower leg rectangles and top-of-foot rectangles are disposed in a detected person region at different positions (and orientations), and positions with the highest matching score are identified as the positions (and orientations) of the lower legs and tops of feet.

Figure 31:
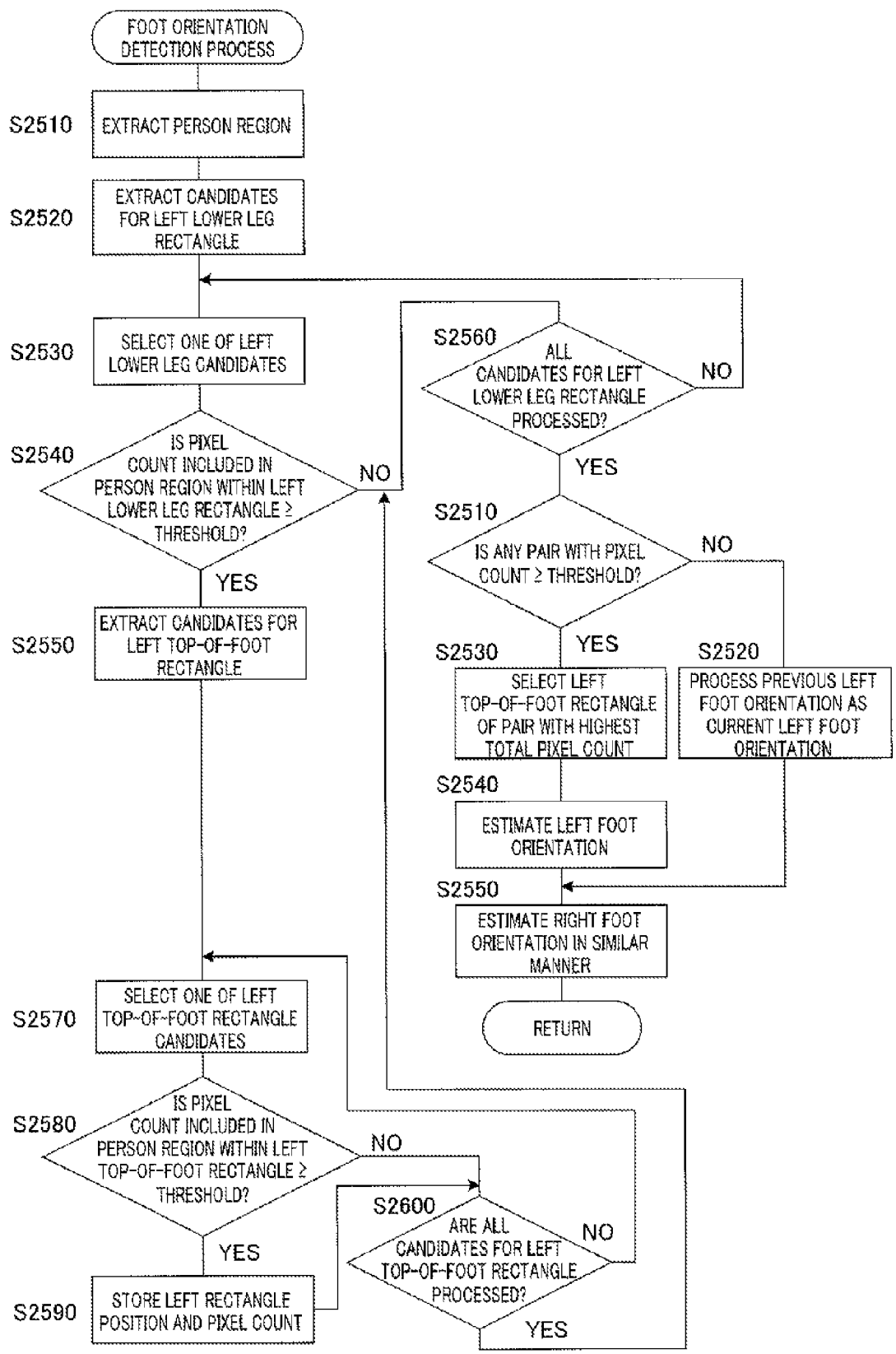
FIG. 31 is a flowchart illustrating an example of foot orientation calculation process in Embodiment 5 of the present invention.

FIG. 31 is a flowchart illustrating an example of foot orientation calculation process (step S2500 in FIG. 30).

At step S2510, lower leg extraction section 171 extracts a region in which a person is positioned (hereinafter referred to as "person region") from input image data. A person region can be extracted by determining the difference between an image including only background which is captured and stored in advance and an image corresponding to the input image data, for example. Alternatively, a person region may be extracted by identifying a still object and a mobile object from the difference between the image for the immediately preceding frame and the current frame.

At step S2520, lower leg extraction section 171 determines one or more candidates for left lower leg rectangle from the extracted person region. Left lower leg rectangle candidates may be determined by treating a predetermined proportion (e.g., 25%) of the person region from its bottom edge as the left and right lower legs and identifying the left/right sides by detecting the face orientation such as through face region detection.

At step S2530, lower leg extraction section 171 selects one of the left lower leg rectangle candidates.

At step S2540, lower leg extraction section 171 counts the number of pixels included in the person region inside the left lower leg rectangle candidate that is currently selected, and determines whether the pixel count is equal to or greater than a first threshold. If the pixel count is equal to or greater than the first threshold (S2540: YES), lower leg extraction section 171 outputs that left lower leg rectangle candidate to top-of-foot extraction section 172 and proceeds to step S2550. If the pixel count is less than the first threshold (S2540: NO), lower leg extraction section 171 proceeds to step S2560.

At step S2550, top-of-foot extraction section 172 determines multiple candidates for top of the left foot rectangle from the image data input from image input section 110 based on the left lower leg rectangle candidate input from lower leg extraction section 171.

Figure 32:
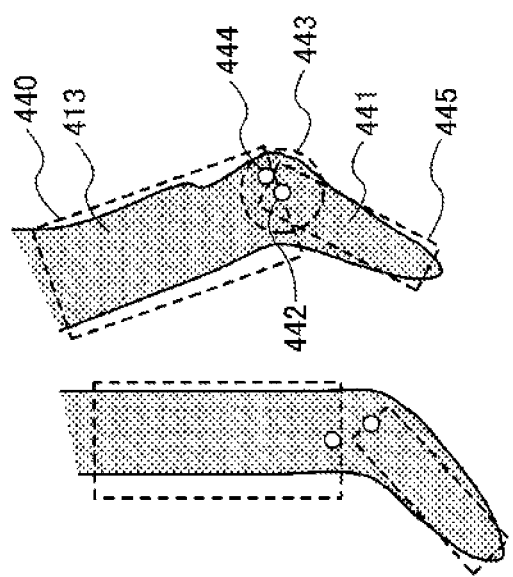
FIG. 32 is a diagram for illustrating how to determine top-of-foot rectangle candidates in Embodiment 5 of the present invention.

FIG. 32 is a diagram for illustrating how to determine top-of-foot rectangle candidates.

As shown in FIG. 32, top-of-foot extraction section 172 first sets a point where left lower leg 413 is connected with top of the left foot 441 in left lower leg rectangle 440 (hereinafter referred to as "leg-side connection point 442") as the center of the bottom side of left lower leg rectangle 440, for example. Top-of-foot extraction section 172 also sets the center of one short side of top of the left foot rectangle 445 as foot-side connection point 444.

For each one of the candidates for left lower leg rectangle 440 that have been determined, top-of-foot extraction section 172 then determines predetermined surrounding range 443 about leg-side connection point 442 of the candidate rectangle. In the determined range 443, top-of-foot extraction section 172 determines multiple candidates for connection point 444 of top of the left foot 441 and left lower leg 413 (hereinafter referred to as "foot-side connection point") (only one candidate is illustrated in FIG. 32). For example, top-of-foot extraction section 172 decides candidates for foot-side connection point 444 at intervals of 5 pixels within the range of 30 pixels about leg-side connection point 442. The positional relationship between leg-side connection point 442 and foot-side connection point 444 is one of body constraints.

For each one of the candidates for foot-side connection point 444 that have been determined, top-of-foot extraction section 172 further determines multiple candidates for top of the left foot rectangle 445 (only one candidate is illustrated in FIG. 32) by rotating a rectangle of a predetermined size about the candidate point. Top-of-foot extraction section 172 decides candidates for top of the left foot rectangle 445 at the intervals of one degree, for example.

By way of example, assume that there are 20 candidates for foot-side connection point 444 and candidates for top of the left foot rectangle 445 are determined at the interval of one degree. In this case, the number of top of the left foot rectangle 445 candidates is: 20×360=7,200. The way (and range and interval) of determining candidates for leg-side connection point 442 and foot-side connection point 444 and/or the way of determining candidates for top of the left foot rectangle 445 (i.e., rotation interval) are not limited to the above examples.

At step S2570 in FIG. 31, top-of-foot extraction section 172 selects one of the top of the left foot rectangle candidates.

At step S2580, top-of-foot extraction section 172 counts the number of pixels which are estimated to be in the person region inside the top of the left foot rectangle candidate that is currently selected. Top-of-fool extraction section 172 then determines whether the pixel count is equal to or greater than a second threshold. If the pixel count is equal to or greater than the second threshold (S2580: YES), top-of-foot extraction section 172 proceeds to step S2590. If the pixel count is less than the second threshold (S2580: NO), top-of-foot extraction section 172 proceeds to step S2600.

At step S2590, top-of-foot extraction section 172 stores the total of pixel counts with the pair of the currently selected left lower leg rectangle and top of the left foot rectangle in association with each other.

At step S2600, top-of-foot extraction section 172 determines whether all the top of the left foot rectangle candidates have been processed. If there is any unprocessed top of the left foot rectangle candidate (S2600: NO), top-of-foot extraction section 172 returns to step S2570 to select and process an unprocessed candidate. If all the top of the left foot rectangle candidates have been processed (S2600: YES), top-of-foot extraction section 172 proceeds to step S2560.

At step S2570, top-of-foot extraction section 172 determines whether all the top of the left foot rectangle candidates have been processed in relation to the currently selected left lower leg rectangle candidate. If there is any unprocessed top of the left foot rectangle candidate (S2600: NO), top-of-foot extraction section 172 returns to step S2570 to select and process an unprocessed candidate. If all the top of the left foot rectangle candidates have been processed (S2600: YES), top-of-foot extraction section 172 proceeds to step S2560.

At step S2560, lower leg extraction section 171 determines whether all the left lower leg rectangle candidates have been processed. If there is any unprocessed left lower leg rectangle candidate (S2560: NO), lower leg extraction section 171 returns to step S2540 to select and process an unprocessed candidate. If all the left lower leg rectangle candidates have been processed (S2560: YES), lower leg extraction section 171 proceeds to step S2510.

At step S2510, top-of-foot extraction section 172 determines whether it has obtained a pair of a left lower leg rectangle candidate and a top of the left foot rectangle candidate for both of which the pixel count is equal to or greater than the threshold. If such a pair has not been obtained (S2510: NO), top-of-foot extraction section 172 proceeds to step S2520. If such a pair has been obtained (S2510: YES), top-of-foot extraction section 172 proceeds to step S2530.

At step S2530, top-of-foot extraction section 172 selects the top of the left foot rectangle candidate of the pair having the largest total pixel count as the final top of the left foot rectangle and outputs it to top-of-foot orientation estimation section 173.

At step S2540, top-of-foot orientation estimation section 173 estimates the left foot orientation from the input top of the left foot rectangle and image data input from image input section 110. Top-of-foot orientation estimation section 173 outputs the result of estimation to foot orientation history storing section 190 and stability calculation section 180. Top-of-foot orientation estimation section 173 may estimate the left foot orientation from the orientation of the longitudinal direction of the top of the left foot rectangle with respect to the foot-side connection point, for example, instead of using image data.

At step S2520, top-of-foot extraction section 172 outputs an indication that the final top of the left foot rectangle cannot be selected to top-of-foot orientation estimation section 173. In response, top-of-foot orientation estimation section 173 retrieves the previous left foot orientation stored in foot orientation history storing section 190 as the current left foot orientation. Top-of-foot orientation estimation section 173 may issue an error to the user if the final top of the left foot rectangle cannot be selected or if the previous left foot orientation is not stored.

At step S2550, foot orientation detection section 170 executes similar processing to steps S2510 to S2540 to estimate and output the right foot orientation and returns to the process of FIG. 30. Foot orientation detection section 170 may estimate the right foot orientation first.

While the method described above uses a person region to estimate foot orientations, foot orientation detection section 170 may use edge information for estimation of foot orientation. For example, images of a lower leg and tops of feet are mainly composed of parallel lines. Foot orientation detection section 170 therefore may extract parallel lines at certain intervals from edges present in a person region and match a region in which parallel lines have been extracted with a lower leg rectangle and a top-of-foot rectangle.

While the above description showed use of rectangles for estimating foot orientation, foot orientation detection section 170 may adopt the method of learning images of tops of feet with orientations and preparing a top-of-foot classifier so that the top of a foot is detected and its orientation is estimated.

At step S2520 where a left lower leg and a right lower leg need to be extracted, it is not necessary to exactly determine which region represents the left or right lower leg if distinction between the front and rear sides is not required for the final posture to be determined.

At step S3500 in FIG. 30, stability calculation section 180 performs stability calculation process to calculate left foot stability and right foot stability.

Figure 33:
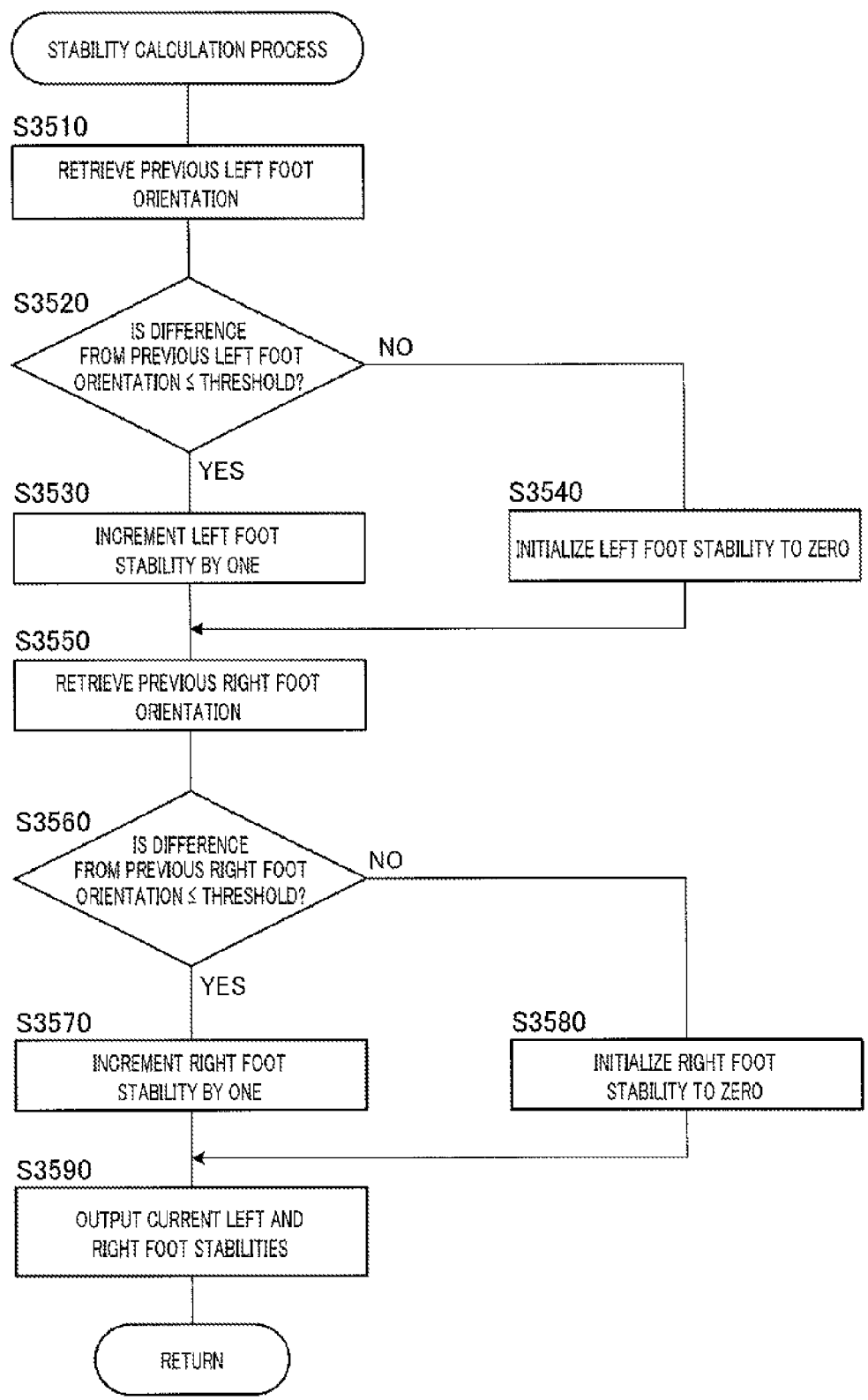
FIG. 33 is a flowchart illustrating an example of a stability calculation process in Embodiment 5 of the present invention.

FIG. 33 is a flowchart illustrating an example of the stability calculation process (step S3500 in FIG. 30).

At step S3510, difference computation section 181 first retrieves the previous left foot orientation from foot orientation history storing section 190. Alternatively, difference computation section 181 may store the left foot orientation that was input from foot orientation detection section 170 the last time.

At stop S3520, difference computation section 181 determines whether the difference between the current left foot orientation and the previous left foot orientation (left foot difference) is equal to or smaller than a third threshold. If the left foot difference is equal to or smaller than the third threshold (S3520: YES), difference computation section 181 notifies stability computation section 182 about it and proceeds to step S3530. If the left foot difference exceeds the third threshold (S3520: NO), difference computation section 181 notifies stability computation section 182 about it and proceeds to step S3540.

At step S3530, stability computation section 182 retrieves the left foot stability stored in stability history storing section 210 and increments the retrieved value by one. The left foot stability is a prepared parameter and its initial value is assumed to be zero herein.

At step S3540, stability computation section 182 retrieves the left foot stability stored in stability history storing section 210 and initializes the retrieved value to zero.

At step S3550, difference computation section 181 retrieves the previous right foot orientation from foot orientation history storing section 190. Alternatively, difference computation section 181 may store the right foot orientation that was input from foot orientation detection section 170 the last time.

At step S3560, difference computation section 181 determines whether the difference between the current right foot orientation and the previous right foot orientation (right foot difference) is equal to or smaller than the third threshold. If the right foot difference is equal to or smaller than the third threshold (S3560: YES), difference computation section 181 notifies stability computation section 182 about it and proceeds to step S3570. If the right foot difference exceeds the third threshold (S3560: NO), difference computation section 181 notifies stability computation section 182 about it and proceeds to step S3580.

At step S3570, stability computation section 182 retrieves the right foot stability stored in stability history storing section 210 and increments the retrieved value by one. The left foot stability is a prepared parameter and its initial value is assumed to be zero herein.

At step S3580, stability computation section 182 retrieves the right foot stability stored in stability history storing section 210 and initializes the retrieved value to zero.

At step S3590, stability computation section 182 outputs the current left foot stability and right foot stability to stability history storing section 210 and posture estimation section 140, and returns to the process of FIG. 30.

At step S5500 in FIG. 30, posture estimation section 140 performs posture estimation process to estimate the body orientation from the left foot stability, right foot stability, left foot orientation, and right foot orientation.

Figure 34:
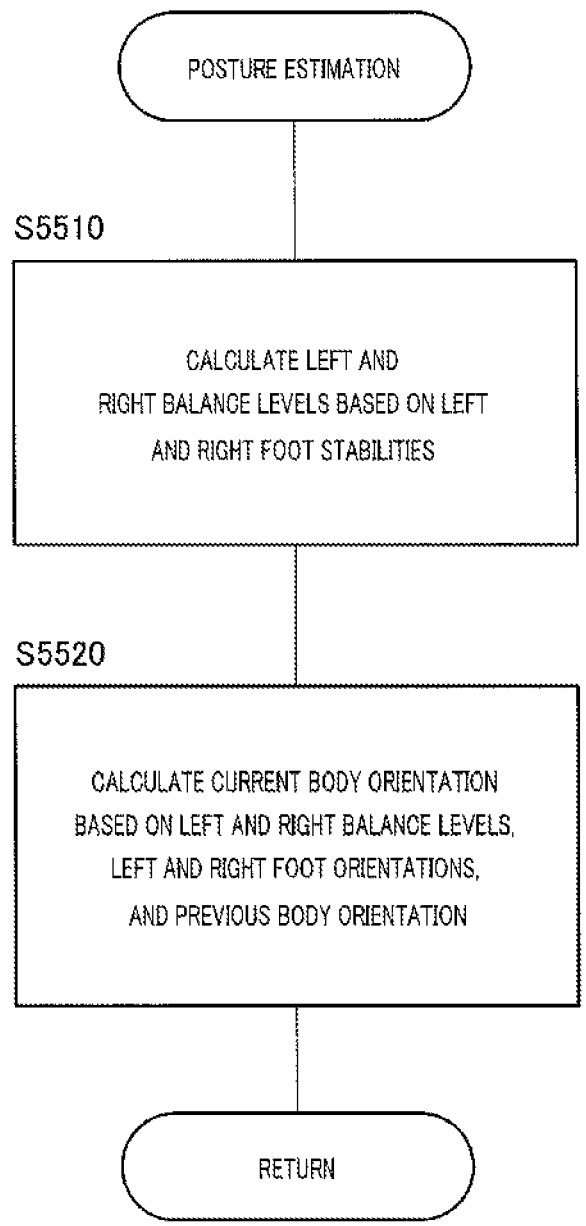
FIG. 34 is a flowchart illustrating an example of the posture estimation process in Embodiment 5 of the present invention.

FIG. 34 is a flowchart illustrating an example of the posture estimation process (step S5500 in FIG. 30).

At step S5510, balance calculation section 141 calculates the left balance level and right balance level described above from the left foot stability and right foot stability input from stability calculation section 180. Balance calculation section 141 then outputs the calculated left balance level and right balance level to posture estimation recording section 142.

Specifically, balance calculation section 141 uses equations (4) and (5) to calculate left balance level and right balance level. When equations (4) and (5) are used, the sum of the left balance level and right balance level will be one.

$$\text{left balance level} = (\text{left foot stability})/\{(\text{left foot stability}) + (\text{right foot stability})\} \quad \text{(Equation 4)}$$

$$\text{right balance level} = (\text{right foot stability})/\{(\text{left foot stability}) + (\text{right foot stability})\} \quad \text{(Equation 5)}$$

At step S5520, posture estimation recording section 142 retrieves the current left foot orientation and right foot orientation stored in foot orientation history storing section 190 and the previous body orientation stored in posture history storing section 220. Posture estimation recording section 142 calculates the current body orientation based on the left foot orientation, right foot orientation it has retrieved, the previous body orientation, and the left balance level and right balance level input to it. Posture estimation recording section 142 then outputs the result of calculation to posture history storing section 220 and estimation result output section 150, and returns to the process of FIG. 30.

Specifically, if the sum of the left balance level and the right balance level is one, posture estimation recording section 142 calculates the current body orientation using equation (6):

$$\text{the current body orientation} = \{(\text{left balance level}) \times (\text{left foot orientation}) + (\text{right balance level}) \times (\text{right foot orientation}) + (\text{the previous body orientation})\}/2 \quad \text{(Equation 6)}$$

Body orientation normally does not change significantly over a short period of time, whereas left foot orientation and/or right foot orientation can be erroneously detected or may not be stable. In such situations, calculation of body orientation only from the current left and right foot orientations could introduce a large error. Accordingly, by taking an average including the previous body orientation, posture estimation recording section 142 can lessen the influence of such an error and prevent reduction in estimation accuracy.

If there is no previous body orientation such as for the initial frame or when the motion of the person is stable, posture estimation recording section 142 may calculate the current body orientation using equation (7):

the current body orientation={(left balance level)×(left foot orientation)+(right balance level)×(right foot orientation)} (Equation 7)

Posture estimation recording section 142 may also calculate the current body orientation using conditional expression (8) below, in which case computation can be speeded up:

If left foot stability and right foot stability are equal: left balance level=right balance level=0.5

If left foot stability and right foot stability are not equal:

balance level for the higher stability=1 balance level for the lower stability=0 (Equation 8)

In the present embodiment, the left foot stability and the right foot stability being equal may mean only that the two values are exactly equal or encompass a case where their difference is within a predetermined range. If the left foot stability and the right foot stability being equal means that their difference is within a predetermined range, the range may be varied according to the circumstances.

At step S7000 in FIG. 30, image input section 110 determines whether termination of processing has been instructed such as through user operation. If termination of processing has not been instructed (S7000: NO), image input section 110 returns to step S1000 to continue to process the next frame. If termination of processing has been instructed (S7000: YES), image input section 110 ends the whole process.

Through such a process, posture estimation apparatus 100c can determine the left foot orientation and right foot orientation per frame, calculate left foot stability and right foot stability, and estimate the body orientation based on the stabilities.

The operation of posture estimation apparatus 100c has been thus far described.

Next, the effect of posture estimation apparatus 100k will be shown with reference to the results of an experiment.

Shown here is the result of an experiment in which a person actually performed the motion of proceeding straight ahead and making a right turn. In the experiment, posture estimation apparatus 100c employed a motion capture system. Posture estimation apparatus 100c obtained information on the three-dimensional positions of the tops of the left foot and right foot, and projected the positions on an image plane to determine the actual left foot orientation, right foot orientation, and body orientation together with the result of body orientation estimation. The actual body orientation means a body orientation to be estimated that is decided and established by an operator from a captured image, for example.

In the accompanying drawings referenced below, the horizontal axis indicates time axis in frame numbers and the vertical axis indicates orientation represented by angle (see FIG. 25) or stability value. In FIGS. 35 to 38 referenced below, the same portions are denoted with the same reference numerals and the descriptions about such portions are omitted.

Figure 35:
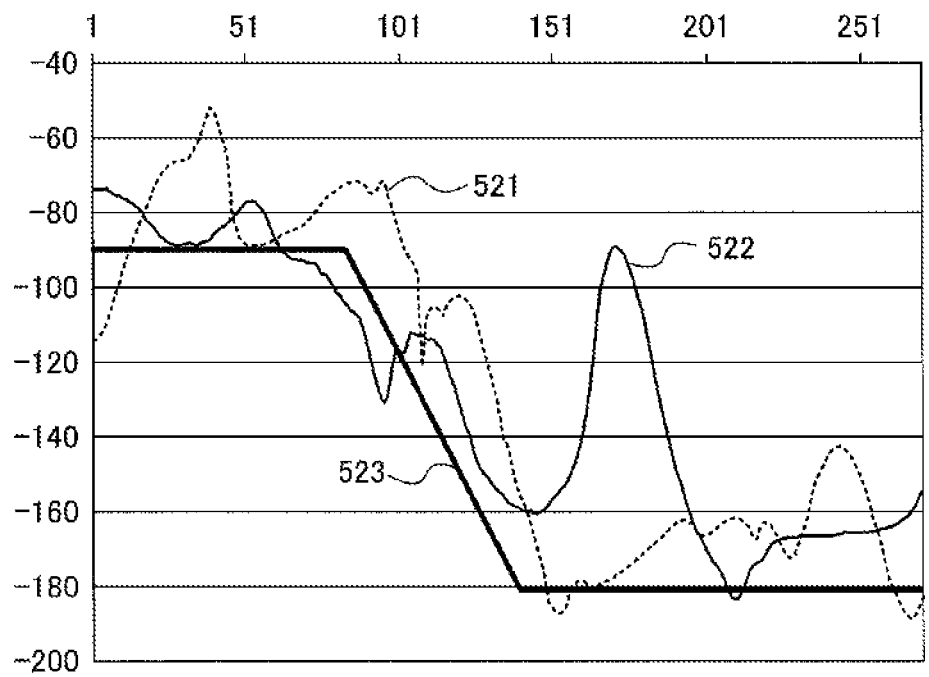
FIG. 35 is a graph showing the result of detecting left foot orientation and right foot orientation in an experiment.

FIG. 35 is a graph showing the result of detection of the left foot orientation and right foot orientation in the experiment.

In FIG. 35, dotted line 521 indicates the left foot orientation, solid line 522 indicates the right foot orientation, and extra-thick line 523 indicates the actual body orientation. As shown in FIG. 35, the left foot orientation and the right foot orientation hardly coincide with each other and both vary irregularly. Also, both the left foot orientation and the right foot orientation have a low degree of agreement with the body orientation. This is because a person's motion is not completely symmetric and does not transition exactly regularly like a sinusoidal wave.

Figure 36:
FIG. 36 is a graph showing the result of calculating left-right average orientation in the experiment.

FIG. 36 is a graph showing the result of calculating left-right average orientation in the experiment.

In FIG. 36, broken line 524 indicates the average feet orientation determined by averaging the left and right foot orientations. As shown in FIG. 36, the average feet orientation coincides with the actual body orientation (extra-thick line 523) at a higher degree than the separate left foot orientation and right foot orientation. However, a difference of up to about 45 degrees occurs, implying that simple averaging cannot accurately estimate the body orientation.

Figure 37:
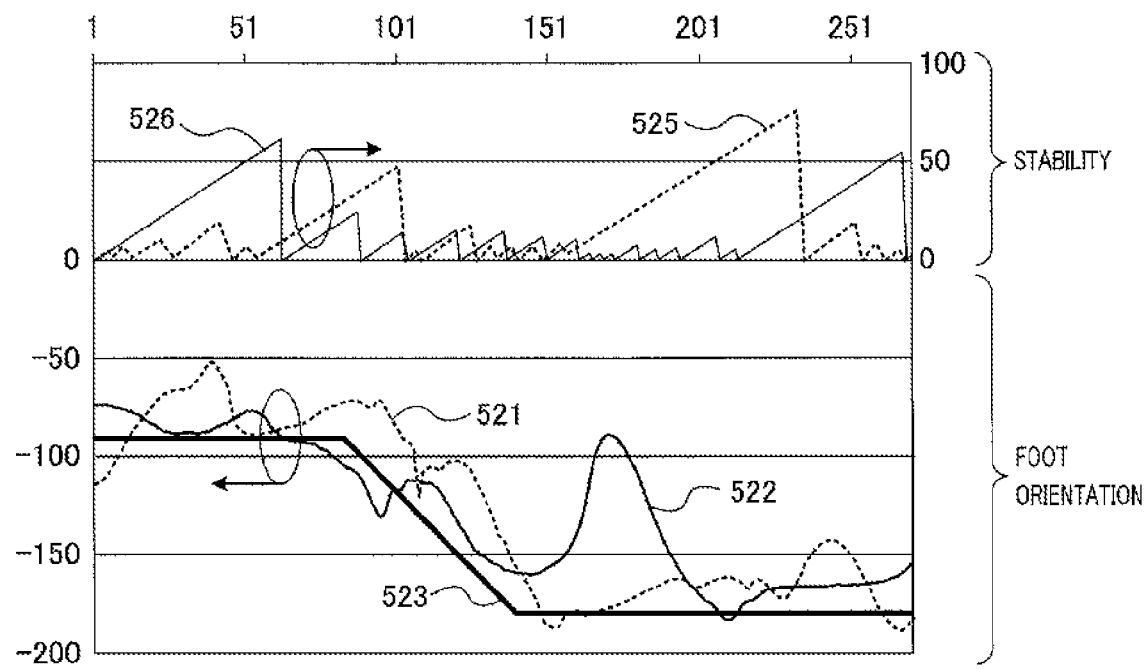
FIG. 37 is a graph showing the result of stability calculation in the experiment according to Embodiment 5 of the present invention.

FIG. 37 is a graph showing the result of stability calculation by posture estimation apparatus 100c in the experiment. FIG. 37 shows the left foot stability and right foot stability above the graph of FIG. 35 on a common time axis.

In FIG. 37, upper dotted line 525 indicates the result of calculating left foot stability and upper solid line 526 indicates the result of calculating right foot stability. As shown in FIG. 37, left foot stability increases as a period in which variation in the left foot orientation is small (i.e., a period in which the same orientation is maintained) is longer, and the right foot stability increases as the period in which variation in right foot orientation is small is longer. The left foot stability maintains a value closer to zero as a period in which variation in left foot orientation is large is longer (i.e., a period in which the orientation of the top of the foot varies at short intervals) is longer, and the right foot stability maintains a value closer to zero as a period in which variation in right foot orientation is large is longer.

For example, the right foot stability is relatively high around frames 1 to 60, while the left toot stability is relatively high around frames 160 to 240.

Figure 38:
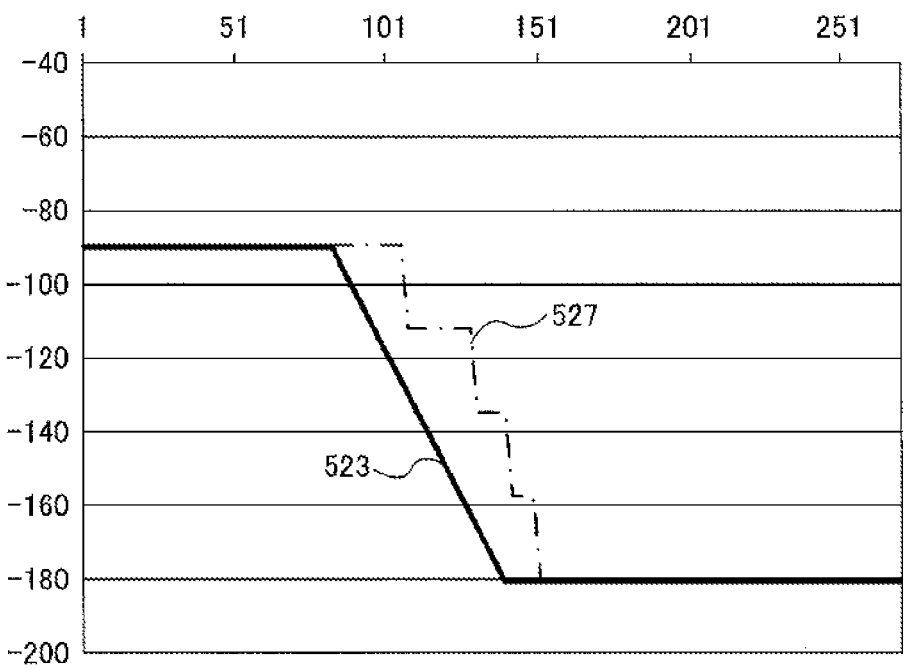
FIG. 38 is a graph showing the result of estimating body orientation in the experiment according to Embodiment 5 of the present invention.

FIG. 38 is a graph showing the result of estimating body orientation by posture estimation apparatus 100 in the present experiment. This result was obtained by using equation (8) above to estimate the body orientation.

In FIG. 38, chain line 527 indicates the result of body orientation estimation by posture estimation apparatus 100c, that is, a left-right average orientation assigned weightings that takes stability into consideration. As will be understood from comparison between FIG. 38 and FIG. 35, the body orientation estimated by posture estimation apparatus 100c exhibits a significantly better agreement with the actual body orientation (extra-thick line 523) though there is some delay compared to simple averaging of the left and right foot orientations.

The results of the experiment thus proved that posture estimation apparatus 100c is able to detect body orientation with high accuracy even at the time of a large variation in body orientation, such as proceeding straight ahead and then making a 90-degree right turn.

The effect of posture estimation apparatus 100c demonstrated by the experiment results has been thus far described.

As described, posture estimation apparatus 100e according to the present embodiment estimates body orientation from left foot orientation and right foot orientation, and left foot stability and right foot stability. Posture estimation apparatus 100c thereby can estimate the posture of a humanoid articulated object with high accuracy.

In the above description, the left foot orientation and right foot orientation were described as being detected finely, such as at intervals of one degree.

Especially when equation (8) is used for estimation of body orientation, however, posture estimation apparatus 100c may detect the left foot orientation and right foot orientation more roughly, such as at intervals of 15 or 22.5 degrees. That is, foot orientation detection section 170 may quantize (or discretize or digitize) foot orientation into orientations separated at a large predetermined interval, from which the left foot orientation and right foot orientation may be detected. This scheme simplifies the decision process in equation (8), which can lessen processing burden and expedite acquisition of the estimation result.

Such quantization can be easily realized by top-of-foot extraction section 172 setting the interval for top-of-foot rectangle orientation for use in matching against a person region at 22.5 degrees, for example. In this case, the number of matching candidates decreases, leading to a further increase in processing speed.

Next, the effect of posture estimation apparatus 100c will be described for a case where foot orientations resulting from detection are quantized at intervals of 22.5 degrees for the same subject of estimation as in FIGS. 35 to 38 with reference to the results of an experiment. In FIGS. 39 to 42 referenced below, the same portions are denoted with the same reference numerals and the descriptions about them are omitted. The actual body orientation is also depicted as quantized at intervals of 22.5 degrees.

Figure 39:
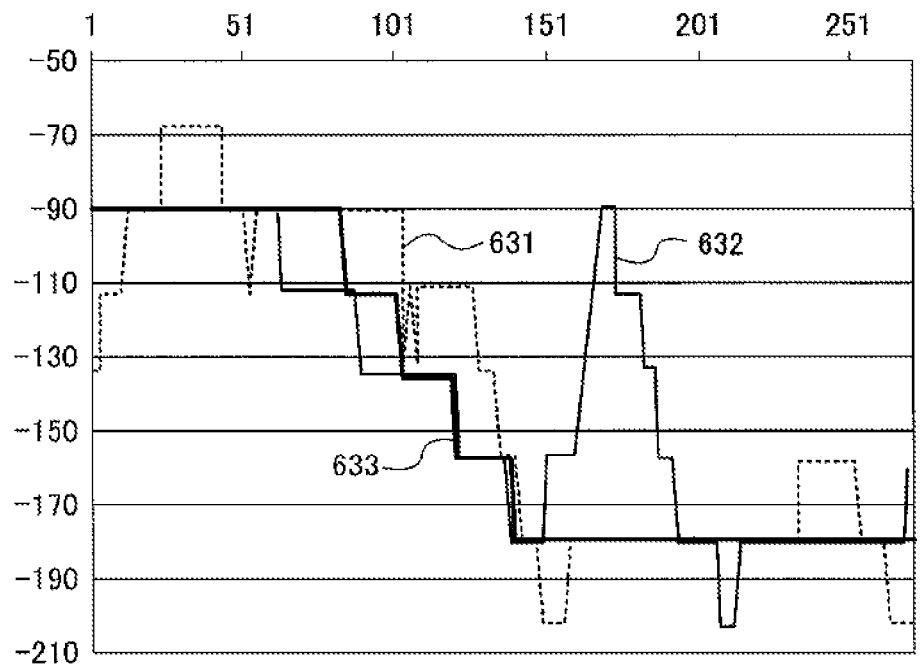
FIG. 39 is a graph showing the result of detecting left foot orientation and right foot orientation in an experiment with quantization of foot orientations.

FIG. 39 is a graph showing the result of detecting left foot orientation and right foot orientation with quantized foot orientations, corresponding to FIG. 35.

In FIG. 39, dotted line 631 indicates quantized left foot orientation, solid line 632 indicates quantized right foot orientation, and extra-thick line 633 indicates quantized actual body orientation. As shown in FIG. 39, even when quantized, left foot orientation and right foot orientation have a low degree of agreement with the body orientation.

Figure 40:
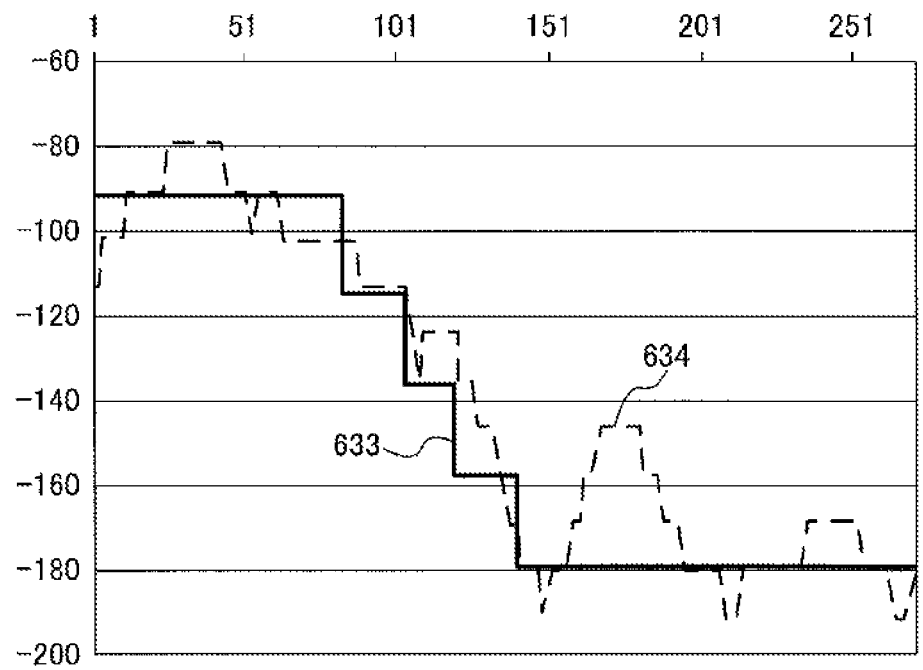
FIG. 40 is a graph showing the result of calculating the left-right average orientation in the experiment with quantization of foot orientations.

FIG. 40 is a graph showing the result of calculating the average feet orientation with quantized foot orientations, corresponding to FIG. 36.

In FIG. 40, broken line 634 indicates the quantized average feet orientation determined by averaging quantized left foot orientations and quantized right foot orientations. As shown in FIG. 40, the quantized average feet orientation does not have a very high degree of agreement with the actual body orientation (extra-thick line 633) either.

Figure 41:
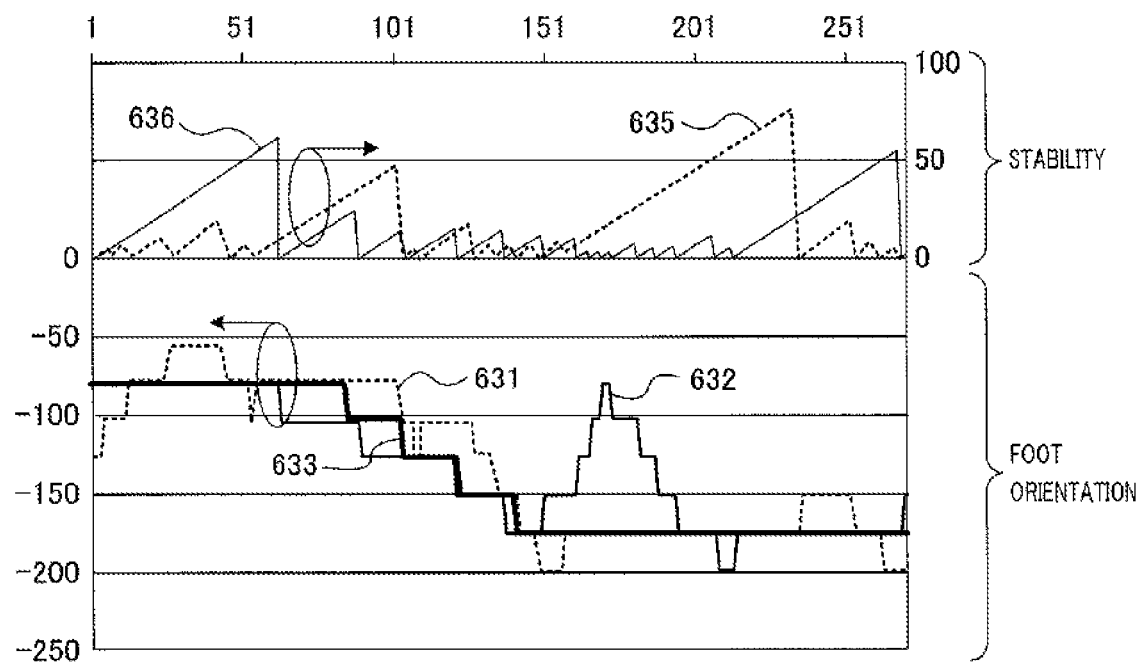
FIG. 41 is a graph showing the result of calculating stability in the experiment with quantization of foot orientations according to Embodiment 5 of the present invention.

FIG. 41 is a graph showing the result of calculating stability with quantized foot orientations, corresponding to FIG. 37.

In FIG. 41, upper dotted line 635 indicates the result of calculating left foot stability and upper solid line 636 indicates the result of calculating right foot stability. As shown in FIG. 41, the left foot stability and right foot stability with quantization hardly differs from the ones without quantization (see FIG. 37).

Figure 42:
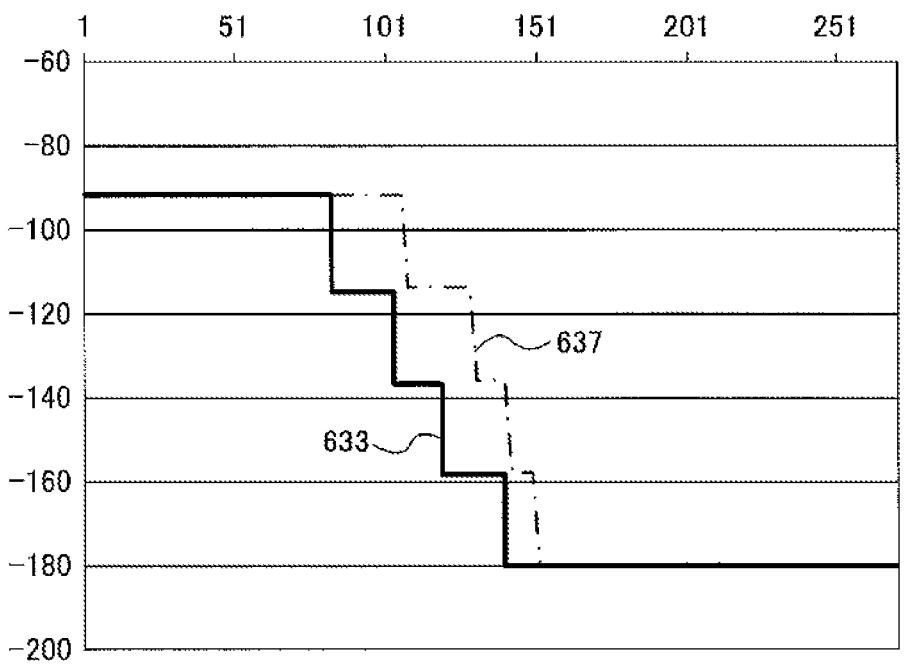
FIG. 42 is a graph showing the result of estimating the body orientation in the experiment with quantization of foot orientations according to Embodiment 5 of the present invention.

FIG. 42 is a graph showing the result of estimating the body orientation with quantized foot orientations, corresponding to FIG. 38.

In FIG. 42, thick line 637 indicates the result of estimating the body orientation by posture estimation apparatus 100c with quantization. As will be understood from comparison between FIG. 42 and FIG. 39, the body orientation estimated by posture estimation apparatus 100c agrees with the actual body orientation (extra-thick line 633) to a significantly higher degree than simple averaging of the left and right foot orientations even when quantization is applied.

As can be seen again from comparison between FIG. 42 and FIG. 39, the accuracy of body orientation estimation by posture estimation apparatus 100c is little affected by whether quantization is applied or not.

As described, the results of the experiments proved that posture estimation apparatus 100c can estimate body orientation with low computation load while maintaining high accuracy by applying quantization of top-of-foot orientations during detection.

Foot orientation detection section 170 may vary the orientation interval in quantization according to a history of left orientation and a history of right foot orientation. For example, foot orientation detection section 170 may set a small unit (or interval) of quantization when a variation in top-of-foot orientations has shifted by an amount smaller than a predetermined value in a predetermined period of time. When the amount of variation in top-of-foot orientations is greater than the predetermined value, foot orientation detection section 170 may set a large unit (or interval) of quantization. Posture estimation apparatus 100c thereby can estimate body orientation robustly against fine noise yet with a reduced processing load.

Although the above description does not mention variations in the scale of person regions in images, the posture estimation apparatus desirably performs posture estimation in consideration of the scale of person regions in images.

In this case, the foot orientation detection section calculates the scale of a person region from its size or from the distance from the camera to the person estimated from the position of the person region, for example. The foot orientation detection section then sets a smaller top-of-foot rectangle for image matching and sets smaller thresholds (the first and second thresholds) for pixel count for a smaller scale of the person region. The stability calculation section also sets a larger threshold (the third threshold) for foot orientation difference for a smaller scale of the person region.

The posture estimation apparatus thereby can estimate a person's posture with high accuracy even when the scale of person regions varies. The foot orientation detection section may also obtain the distance from the camera to each of the lower legs, calculate the scale of the image regions of the lower legs (or the tops of the feet) from the distances to them, and modify the thresholds per leg.

The way of extracting the left foot orientation and right foot orientation is not limited to the scheme described in the above examples. The posture estimation apparatus may also calculate the left foot orientation and right foot orientation based on the positions of the person's joints determined by a motion capture system. The posture estimation apparatus may also extract the left foot orientation and right foot orientation based on a likelihood map showing distribution of the certainty that body parts of a person are present.

The posture estimation apparatus may also extract the left foot orientation and right foot orientation from video or an image obtained by a depth map camera or stereo camera, instead of video captured by a monocular camera.

The way of calculating the left foot stability and right foot stability is not limited to the scheme described in the above example. For example, when the orientation of the top of a foot has varied by an amount equal to or greater than a predetermined threshold, the posture estimation apparatus may decrease the stability by a predetermined value, such as one, instead of initializing it to zero.

The posture estimation apparatus may also use further preceding orientations of the tops of feet or results of body orientation estimation in addition to the most recent orientations of the tops of feet or result of body orientation estimation when estimating body orientation.

The posture estimation apparatus may also estimate the orientation of the body trunk of various humanoid articulated objects including a humanoid robot or a bipedal animal instead of a human being.

The disclosures of Japanese Patent Application No. 2011-156809 filed on Jul. 15, 2011 and Japanese Patent Application No. 2012-022283 filed on Feb. 3, 2012, including the specifications, drawings, and abstracts, are incorporated herein by reference in their entirety.

INDUSTRIAL APPLICABILITY

The present invention is advantageous as a posture estimation apparatus, posture estimation method, and posture estimation program that can estimate the posture of a humanoid articulated object with high accuracy.

REFERENCE SIGNS LIST 100, 100b, 100c Posture estimation apparatus
110 Image input section
120 Head estimation section
130 Foot estimation section
131 Sole region estimation section
132 Sole centroid estimation section
140 Posture estimation section
141 Balance calculation section
142 Posture estimation recording section
150 Estimation result output section
160b Upper-body posture estimation section
170 Foot orientation detection section
171 Lower leg extraction section
172 Top-of-foot extraction section
173 Top-of-foot orientation estimation section
180 Stability calculation section
181 Difference computation section
182 Stability computation section
190 Foot orientation history storing section
200 Posture estimation system
220 Posture history storing section
310 Monitored area
320 Monitoring camera
330 Floor
340 Person

The invention claimed is:

1. A posture estimation apparatus comprising:
a head estimation section that estimates a position of a head of a person from image information on an image including the person;
a foot estimation section that estimates a position of a foot of the person from the image information, the foot including a sole being parallel with a floor; and
a posture estimation section that estimates a posture of the person based on a relative positional relationship between the estimated position of the head and the estimated position of the foot,
wherein the posture estimation section estimates that a side on which the position of the foot is located relative to the position of the head is a front side of the person,
the foot estimation section comprises:
a sole estimation section that estimates a sole region of the person in the image from the image information; and
a sole centroid estimation section that estimates, from the estimated sole region, a foot centroid position representing a centroid position of a region of the estimated sole region, the region of the estimated sole region being parallel with the floor, and that sets the estimated foot centroid position as the foot position,
the image is generated by capturing an image of a real space including the person and the floor
the floor is horizontal,
the sole estimation section estimates a boundary between the foot and a background in the image from the image information and estimates the sole region based on the estimated boundary, and
the sole centroid estimation section estimates the foot centroid position based on a comparison between a direction of the estimated boundary and a horizontal direction in the real space.

2. The posture estimation apparatus according to claim 1, wherein:
the image information is image information on an image that includes the person and the floor; and
the foot estimation section sets the position of a foot that is in contact with the floor as the position of the foot including a sole being parallel with the floor.

3. The posture estimation apparatus according to claim 1, wherein:
the head estimation section estimates a region of the head in the image from the image information and sets a head centroid position representing a centroid position of the estimated region of the head as the head position.

4. The posture estimation apparatus according to claim 1, wherein:
the sole estimation section estimates sole regions for respective feet of the person; and
the sole centroid estimation section estimates the foot centroid position using only one of the sole regions that contains more components in a direction of the boundary than the rest of the sole regions, the direction of the boundary approximating to the horizontal direction.

5. The posture estimation apparatus according to claim 1, wherein the sole centroid estimation section assigns a weighting to the estimated sole region such that a portion of the estimated sole region that corresponds to the boundary in a direction approximating to the horizontal direction is assigned a greater weighting, and sets the centroid position obtained using the weighting, as the foot centroid position.

6. The posture estimation apparatus according to claim 1, wherein:
the image is an image that includes a plurality of intermittently captured images of the real space; and
the sole centroid estimation section estimates the foot centroid position from an overlapping region which is a region of the estimated sole region, the region being estimated to be the sole region both in an image captured at a first time and an image captured at a second time which is later than the first time by a predetermined time period.

7. The posture estimation apparatus according to claim 1, further comprising:
an upper-body posture estimation section that estimates an angle of an upper-body of the person from the image information; and an estimation result output section that outputs a result of estimation of the posture by the posture estimation section, wherein the estimation result output section outputs the result of estimation of the posture when the estimated angle of the upper body is within a predetermined range, as a condition of outputting the result of estimation of the posture.

8. The posture estimation apparatus according to claim 1, further comprising:

a foot orientation detection section that detects a left foot orientation and a right foot orientation of a humanoid articulated object including a human body;

a stability calculation section that calculates left foot stability representing a degree of stability of the left foot orientation and right foot stability representing a degree of stability of the right foot orientation; and a posture estimation section that estimates the orientation of a trunk of the object as the posture from the left foot stability, the left foot orientation, the right foot stability, and the right foot orientation.

9. The posture estimation apparatus according to claim 8, wherein the posture estimation section estimates the orientation of the trunk as the posture by applying a weighting based on the left foot stability and the right foot stability and combining the left foot orientation and the right foot orientation.

10. The posture estimation apparatus according to claim 9, further comprising:

a foot orientation history storing section that stores the left foot orientation and the right foot orientation that have been detected, wherein the stability calculation section calculates the left foot stability from a history of the left foot orientation and calculates the right foot stability from a history of the right foot orientation.

11. The posture estimation apparatus according to claim 10, wherein:

the stability calculation section calculates the left foot stability as a greater value as variation in the left foot orientation continues to be small for a longer period of time, and calculates the right foot stability as a greater value as variation in the right foot orientation continues to be small for a longer period of time; and the posture estimation section calculates the weighting for the left foot orientation as a greater value for a higher value of the left foot stability, and calculates the weighting for the right foot orientation as a greater value for a higher value of the right foot stability.

12. The posture estimation apparatus according to claim 11, further comprising:

a posture history storing section that stores the estimated orientation of the trunk, wherein the posture estimation section estimates the orientation of the trunk from the left foot stability, the left foot orientation, the right foot stability, the right foot orientation, and a most recently estimated orientation of the trunk.

13. The posture estimation apparatus according to claim 8, further comprising:

a foot orientation history storing section that stores the left foot orientation and the right foot orientation that have been detected, wherein when detection of the left foot orientation is impossible, the foot orientation detection section retrieves the most recently detected left foot orientation as the left foot orientation detected this time, and when detection of the right foot orientation is impossible, the foot orientation detection section retrieves the most recently detected right foot orientation as the right foot orientation detected this time.

14. The posture estimation apparatus according to claim 8, further comprising:

an image input section that receives an image of the object, wherein the foot orientation detection section comprises:

a lower leg detection section that extracts a left lower leg and a right lower leg of the object from the image;

a top-of-foot extraction section that extracts a top of a left foot from the image and from the detected left lower leg and extracts a top of a right foot from the image and from the detected right lower leg; and a foot orientation estimation section that estimates the left foot orientation from the extracted top of the left foot and estimates the right foot orientation from the extracted top of the right foot.

15. The posture estimation apparatus according to claim 8, wherein:

the foot orientation detection section detects the left foot orientation and the right foot orientation with quantization into a plurality of orientations at a predetermined interval; and the stability calculation section calculates the left foot stability as a greater value as the left foot orientation remains invariant for a longer period of time, and calculates the right foot stability as a greater value as the right foot orientation remains invariant for a longer period of time.

16. The posture estimation apparatus according to claim 15, further comprising:

a foot orientation history storing section that stores the detected left foot orientation and the detected right foot orientation, wherein the foot orientation detection section varies the interval of the orientations in the quantization according to a history of the left foot orientation and a history of the right foot orientation.

\* \* \* \* \*